(12) United States Patent
Ghosh et al.

(10) Patent No.: US 11,611,414 B2
(45) Date of Patent: Mar. 21, 2023

(54) NON-LEGACY PREAMBLE FOR WIRELESS LOCAL AREA NETWORKS

(71) Applicant: InterDigital Patent Holdings, Inc., Wilmington, DE (US)

(72) Inventors: Monisha Ghosh, Chicago, IL (US); Nirav B. Shah, San Diego, CA (US); Sudheer A. Grandhi, Pleasanton, CA (US); Ronald G. Murias, Calgary (CA); Guodong Zhang, Woodbury, NY (US); Xiaofei Wang, Cedar Grove, NJ (US); Hanqing Lou, Syosset, NY (US); Robert L. Olesen, Huntington, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/213,633

(22) Filed: Dec. 7, 2018

(65) Prior Publication Data

US 2019/0109681 A1   Apr. 11, 2019

Related U.S. Application Data

(63) Continuation of application No. 13/530,576, filed on Jun. 22, 2012, now abandoned.
(Continued)

(51) Int. Cl.
*H04L 5/00* (2006.01)
*H04L 1/00* (2006.01)
*H04L 25/02* (2006.01)

(52) U.S. Cl.
CPC .......... *H04L 5/0023* (2013.01); *H04L 1/0025* (2013.01); *H04L 1/0041* (2013.01);
(Continued)

(58) Field of Classification Search
CPC ... H04L 1/0025; H04L 1/0041; H04L 1/0059; H04L 1/0061; H04L 25/0226; H04L 5/0023; H04L 5/0053
(Continued)

(56) References Cited

U.S. PATENT DOCUMENTS 8,306,160 B2    11/2012  Takahashi et al.
8,462,863 B1 *   6/2013  Zhang ................. H04L 27/2602
                                                            375/260
(Continued)

FOREIGN PATENT DOCUMENTS

WO       2011/031058       3/2011

OTHER PUBLICATIONS

Cheong, "IEEE P802.11 Wireless LANs, TGah Functional Requirements and Evaluation Methodology Rev. 5," IEEE 802.11-11/0905r5, Jan. 2012.
(Continued)

*Primary Examiner* — Robert J Lopata
(74) *Attorney, Agent, or Firm* — Volpe Koenig

(57) ABSTRACT

Method and apparatus for transmission and reception of a Greenfield preamble are provided. In the method and apparatus, the Greenfield preamble may be a single user (SU) preamble or a multi user (MU) preamble. As an MU preamble, the Greenfield preamble includes a short training field (STF), a first long training field (LTF), a first signal (SIG) field, at least one additional LTF, and a second SIG field. Additionally, the Greenfield preamble may be utilized for efficient transmission and reception of control information to wireless devices, whereby the control information may be indicated using the STF, the first LTF, or the first or second SIG fields.

18 Claims, 14 Drawing Sheets

Related U.S. Application Data

(60) Provisional application No. 61/500,930, filed on Jun. 24, 2011, provisional application No. 61/586,525, filed on Jan. 13, 2012, provisional application No. 61/607,345, filed on Mar. 6, 2012, provisional application No. 61/645,948, filed on May 11, 2012.

(52) U.S. Cl.
CPC .......... *H04L 1/0059* (2013.01); *H04L 1/0061* (2013.01); *H04L 5/0048* (2013.01); *H04L 5/0053* (2013.01); *H04L 25/0226* (2013.01)

(58) Field of Classification Search
USPC .......................................................... 370/508
See application file for complete search history.

(56) References Cited

U.S. PATENT DOCUMENTS

| | | | |
|---|---|---|---|
| 8,498,245 B2 | 7/2013 | Wu et al. | |
| 9,281,877 B2* | 3/2016 | Zhang | H04B 7/0452 |
| 9,480,018 B2* | 10/2016 | Liu | H04W 52/58 |
| 2006/0280134 A1 | 12/2006 | Kwon et al. | |
| 2007/0081602 A1 | 4/2007 | Tanaka et al. | |
| 2008/0049654 A1 | 2/2008 | Otal et al. | |
| 2008/0186868 A1 | 8/2008 | Ma et al. | |
| 2009/0040999 A1 | 2/2009 | Yuk | |
| 2009/0262694 A1 | 10/2009 | Lee et al. | |
| 2010/0246705 A1 | 9/2010 | Shin et al. | |
| 2010/0309868 A1* | 12/2010 | Yang | H04W 72/121 |
| | | | 370/329 |
| 2010/0322330 A1 | 12/2010 | Jongren et al. | |
| 2010/0329236 A1 | 12/2010 | Sampath et al. | |
| 2010/0329374 A1 | 12/2010 | Pi | |
| 2011/0032875 A1* | 2/2011 | Erceg | H04L 1/0075 |
| | | | 370/328 |
| 2011/0096796 A1 | 4/2011 | Zhang et al. | |
| 2011/0103280 A1 | 5/2011 | Liu et al. | |
| 2011/0110348 A1* | 5/2011 | Lee | H04L 1/0061 |
| | | | 370/338 |
| 2011/0122805 A1 | 5/2011 | Abraham et al. | |
| 2011/0149882 A1 | 6/2011 | Gong et al. | |
| 2011/0150148 A1 | 6/2011 | Son et al. | |
| 2011/0243017 A1 | 10/2011 | Prasad et al. | |
| 2011/0255620 A1 | 10/2011 | Jones, IV et al. | |
| 2011/0305233 A1 | 12/2011 | Seok | |
| 2012/0020261 A1 | 1/2012 | Van Zelst et al. | |
| 2012/0127940 A1* | 5/2012 | Lee | H04L 5/001 |
| | | | 370/329 |
| 2012/0269123 A1* | 10/2012 | Porat | H04L 1/0041 |
| | | | 370/328 |
| 2012/0269124 A1* | 10/2012 | Porat | H04W 52/18 |
| | | | 370/328 |
| 2012/0269142 A1* | 10/2012 | Porat | H04L 27/2618 |
| | | | 370/329 |
| 2012/0294294 A1* | 11/2012 | Zhang | H04L 1/0033 |
| | | | 370/338 |
| 2012/0314667 A1* | 12/2012 | Taoka | H04L 1/1896 |
| | | | 370/329 |
| 2012/0327871 A1* | 12/2012 | Ghosh | H04L 5/0023 |
| | | | 370/329 |
| 2013/0121243 A1 | 5/2013 | Vermani et al. | |
| 2013/0128807 A1 | 5/2013 | Vermani et al. | |
| 2014/0078966 A1 | 3/2014 | Erceg et al. | |
| 2014/0140312 A1* | 5/2014 | Lee | H04B 7/0452 |
| | | | 370/329 |
| 2014/0226735 A1 | 8/2014 | Zhang et al. | |
| 2014/0241458 A1 | 8/2014 | Zhang et al. | |
| 2014/0293916 A1 | 10/2014 | Sohn et al. | |

OTHER PUBLICATIONS

De Vegt, "Spec Framework Text for .11ah Bandwidth Modes," IEEE 802.11-11/1294r0, Sep. 18, 2011.
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.4 (Nov. 2011).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 3: TV White Spaces Operation, IEEE P802.11af/D1.02, Jun. 2011.
Gong et al., "11ah Channelization of China," IEEE 802.11-11/1320r0, Sep. 21, 2011.
Institute of Electrical and Electronics Engineers, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Higher Throughput," IEEE Std 802.11n-2009, Sep. 2009.
Park, "Proposed Specification Framework for TGAH," IEEE 802.11-1137r5, Jan. 19, 2012.
Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—High Speed Physical Layer in the 5GHz Band, IEEE 802.11a-1999 (R2003), Jun. 2003.
Vermani et al., "Preamble Format for 1 MHz," IEEE 802.11-11/1482r2, Nov. 7, 2011.
Vermani et al., "Spec Framework Text for PHY Numerology," IEEE 802.11-11/1311r0, Sep. 21, 2011.
Zhang et al., "11ah Preamble for 2MHz and Beyond," IEEE 802.11-11/1483r1, Nov. 7, 2011.
Chen et al., "Proposed TGac Draft Amendment," IEEE 802.11-10/1361r3 (Jan. 2011).

\* cited by examiner

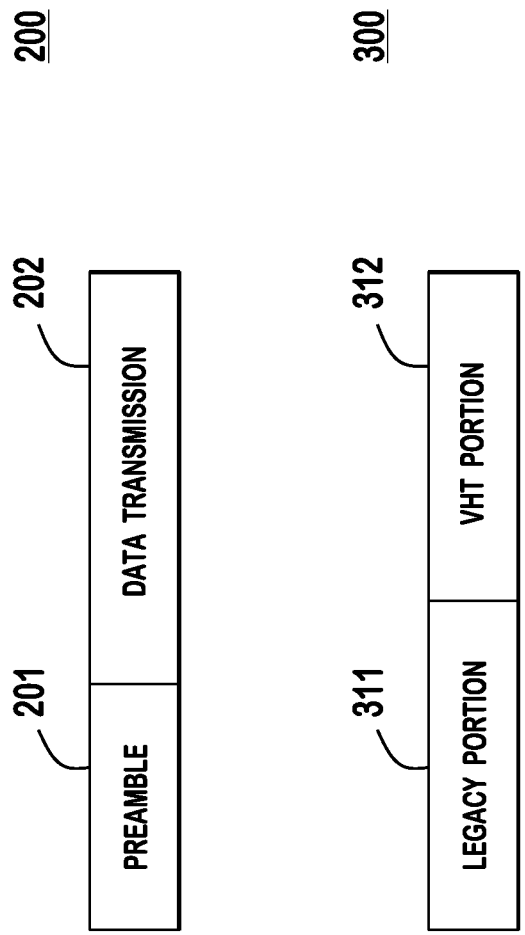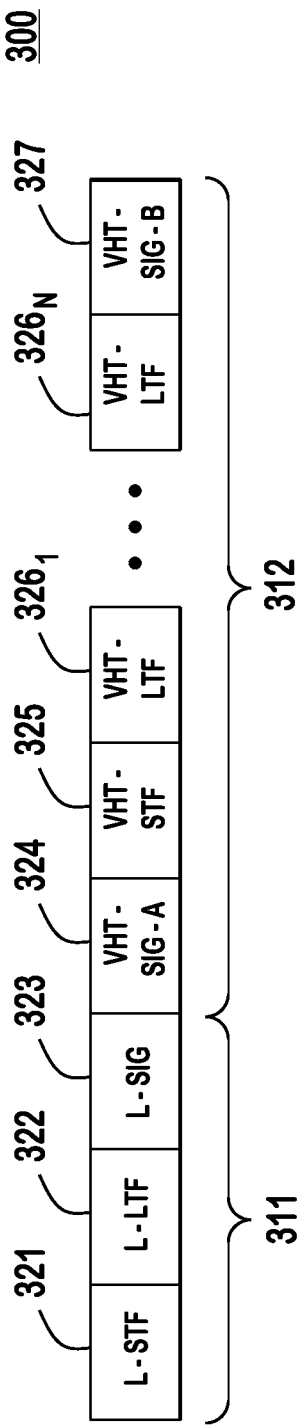
FIG. 2
FIG. 3A
FIG. 3B

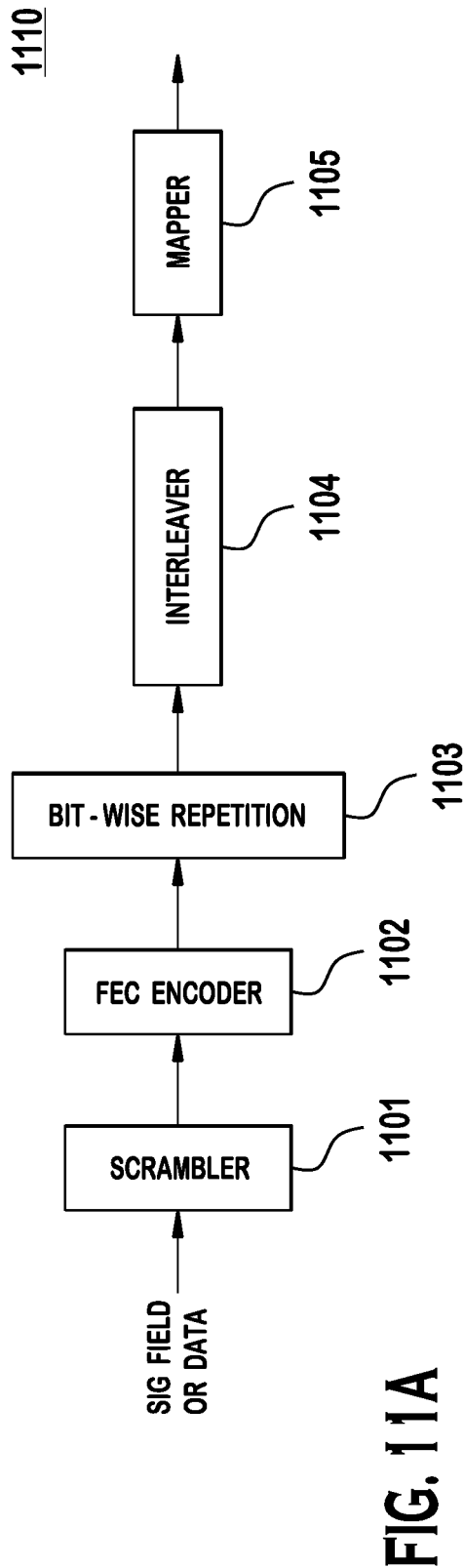
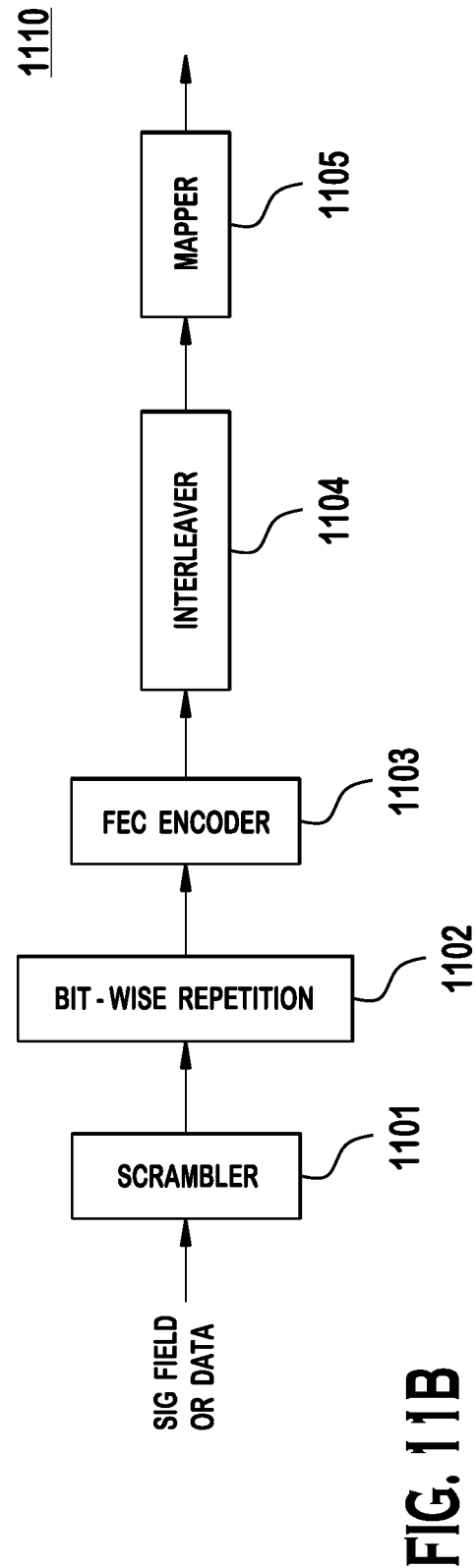
FIG. 11A
FIG. 11B

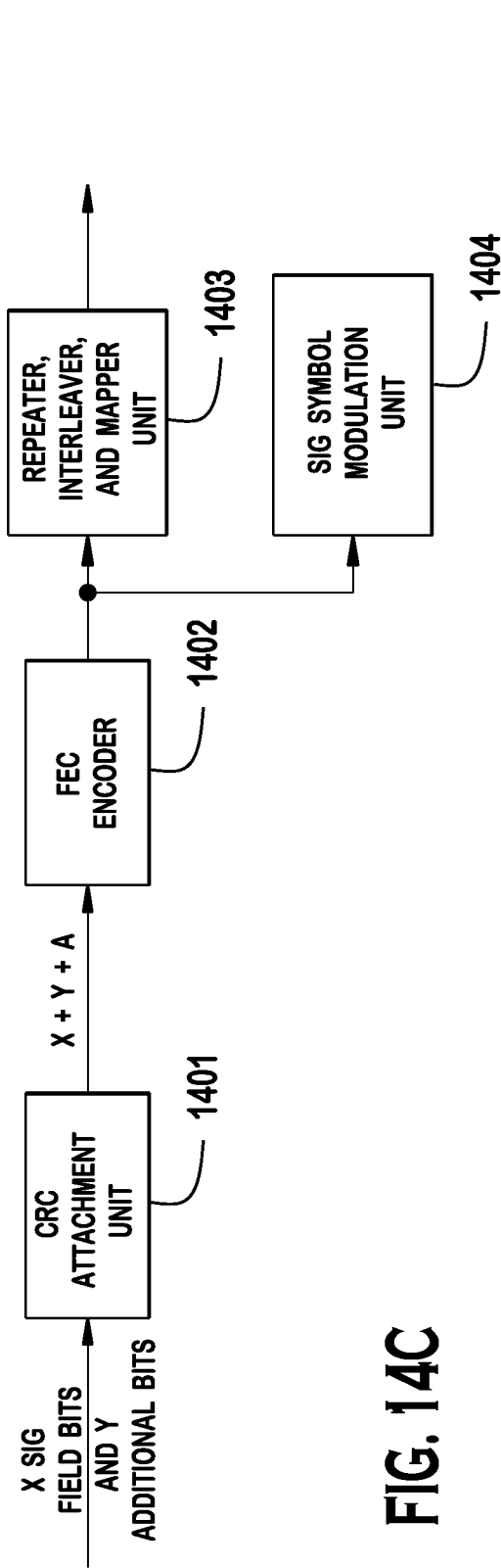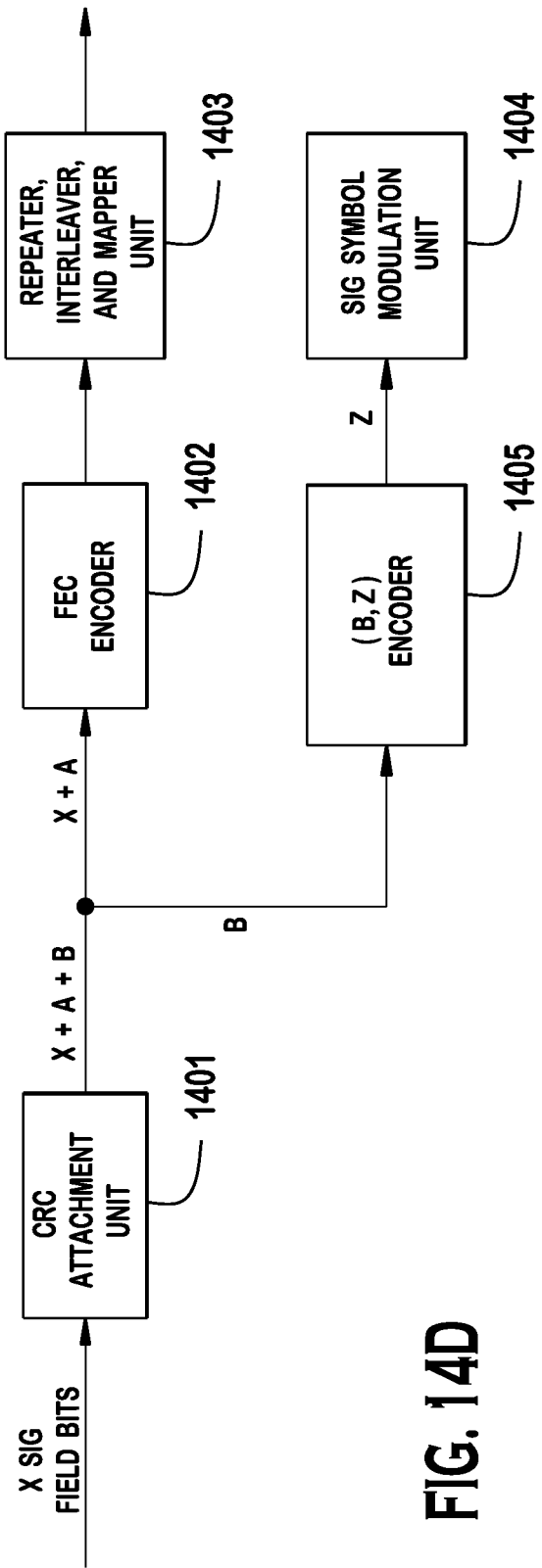
FIG. 14C
FIG. 14D

NON-LEGACY PREAMBLE FOR WIRELESS LOCAL AREA NETWORKS

CROSS REFERENCE TO RELATED APPLICATIONS

This application is a continuation of U.S. patent application Ser. No. 13/530,576 filed Jun. 22, 2012 and claims the benefit of U.S. provisional application No. 61/500,930 filed on Jun. 24, 2011, U.S. provisional application No. 61/586,525 filed on Jan. 13, 2012, U.S. provisional application No. 61/607,345 filed on Mar. 6, 2012, and U.S. provisional application No. 61/645,948 filed on May 11, 2012, the contents of which are hereby incorporated by reference herein as if fully set forth.

BACKGROUND

The usage of preambles is very common in wireless communication systems. Preambles provide efficient and effective ways for communications devices to obtain channel conditions. In addition, preambles are also useful for relaying control information to communications devices, including modes of operation and the manner in which data is to be transmitted or received in a communications system.

In some communications systems, preambles are transmitted before every data transmission and, therefore, the preambles often occupy a large portion of the volume of traffic in a communications system. Additionally, as communications systems become more advanced and incorporate various technologies, preambles are expected to carry more control information often using shrinking bandwidth resources.

It is, therefore, desirable to have a method and apparatus for preamble transmission and reception in which preambles efficiently relay information between communications devices. It is also desirable for the preambles to be compliant with advanced communications protocols.

SUMMARY

Method and wireless transmit/receive unit (WTRU) for receiving a preamble in multi-user (MU) multiple input multiple output (MIMO) communications are provided. In the method and WTRU, the preamble comprising a short training field (STF), a first long training field (LTF), a first signal (SIG) field, one or more additional LTFs, and a second SIG field is received. The preamble may be a multi-user (MU) preamble. Further in the method and WTRU, time or frequency acquisition may be performed based on the STF and channel estimation may be performed based on the first LTF. Additionally, in the method and WTRU, a first control information is obtained from the first SIG field and a second control information is obtained from the second SIG field, whereby the first control information is associated with multiple receivers and the second control information is associated with a subset of the multiple receivers.

In one embodiment, the first LTF may comprise two long training symbols preceded by a double length cyclic prefix and in another embodiment, the first SIG field may indicate whether the preamble is a single user (SU) preamble or a multi user (MU) preamble. In a further embodiment, cyclic redundancy check (CRC) masking of the first field may indicate whether the preamble is an SU preamble or an MU preamble. In an additional embodiment, the first SIG field or the second SIG field may indicate an operating bandwidth or whether data transmission is aggregated.

BRIEF DESCRIPTION OF THE DRAWINGS

A more detailed understanding may be had from the following description, given by way of example in conjunction with the accompanying drawings wherein:

FIG. 2 shows a preamble for a data transmission;

FIG. 3A shows a mixed format preamble;

FIG. 3B shows an example of a mixed format preamble;

FIG. 11A shows an example of bit-wise repetition performed after forward error correction (FEC) encoding;

FIG. 11B shows bit-wise repetition performed before FEC encoding;

FIG. 14C shows an example of coding of SIG field bits and additional bits; and

FIG. 14D shows an example of coding of SIG field bits and additional cyclic redundancy check (CRC) bits.

DETAILED DESCRIPTION

Figure 1A:
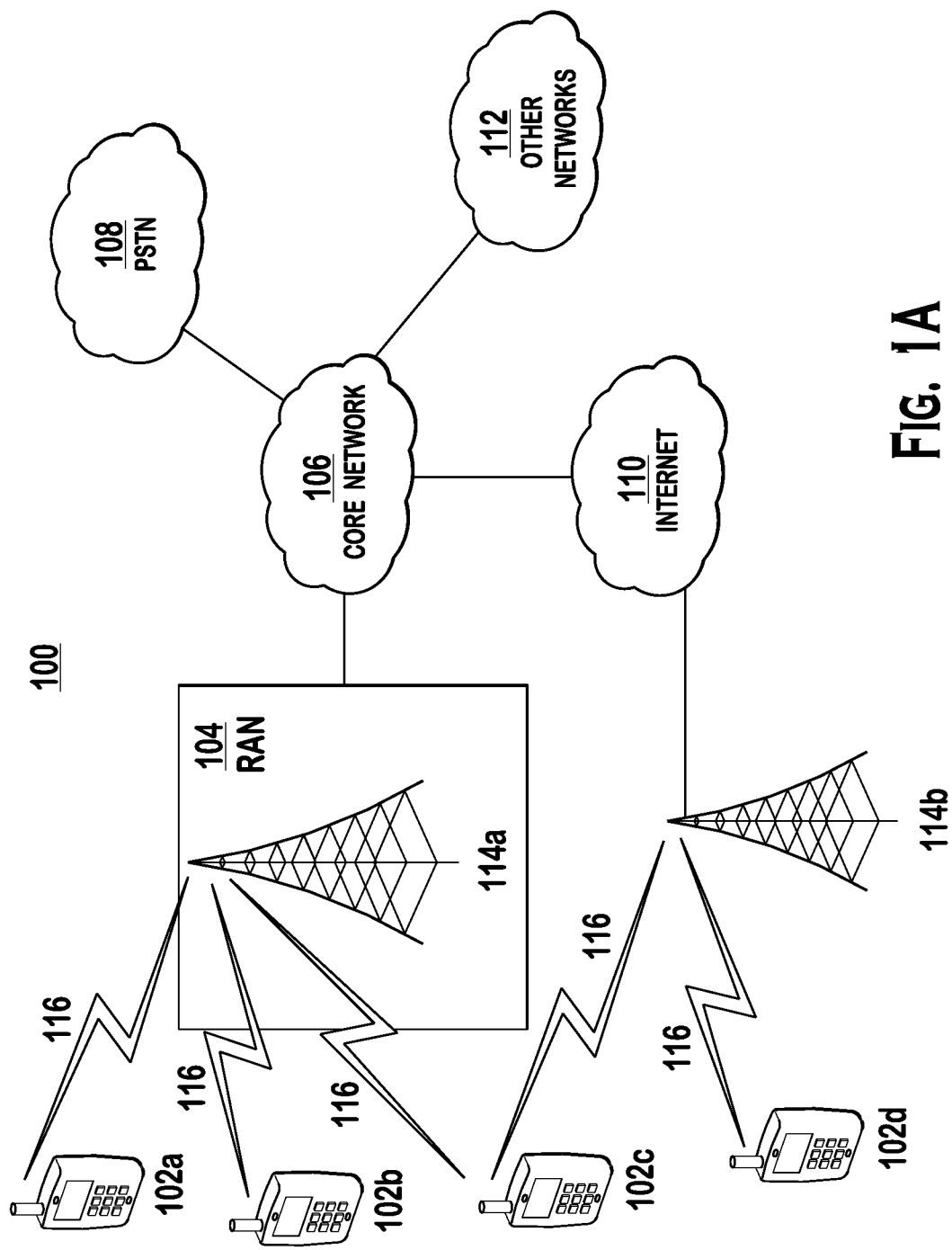
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as Institute for Electrical and Electronics Engineers (IEEE) 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
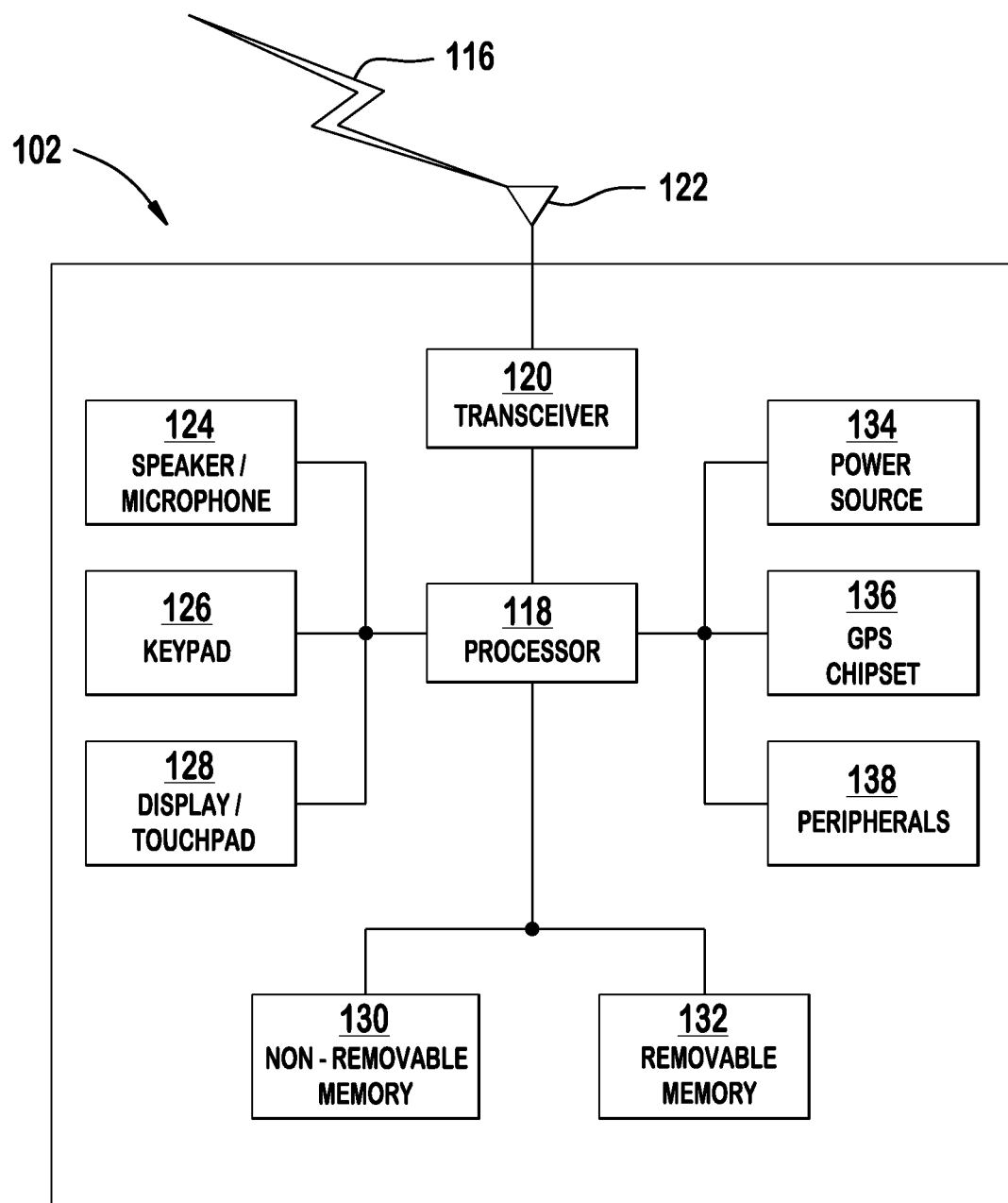
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
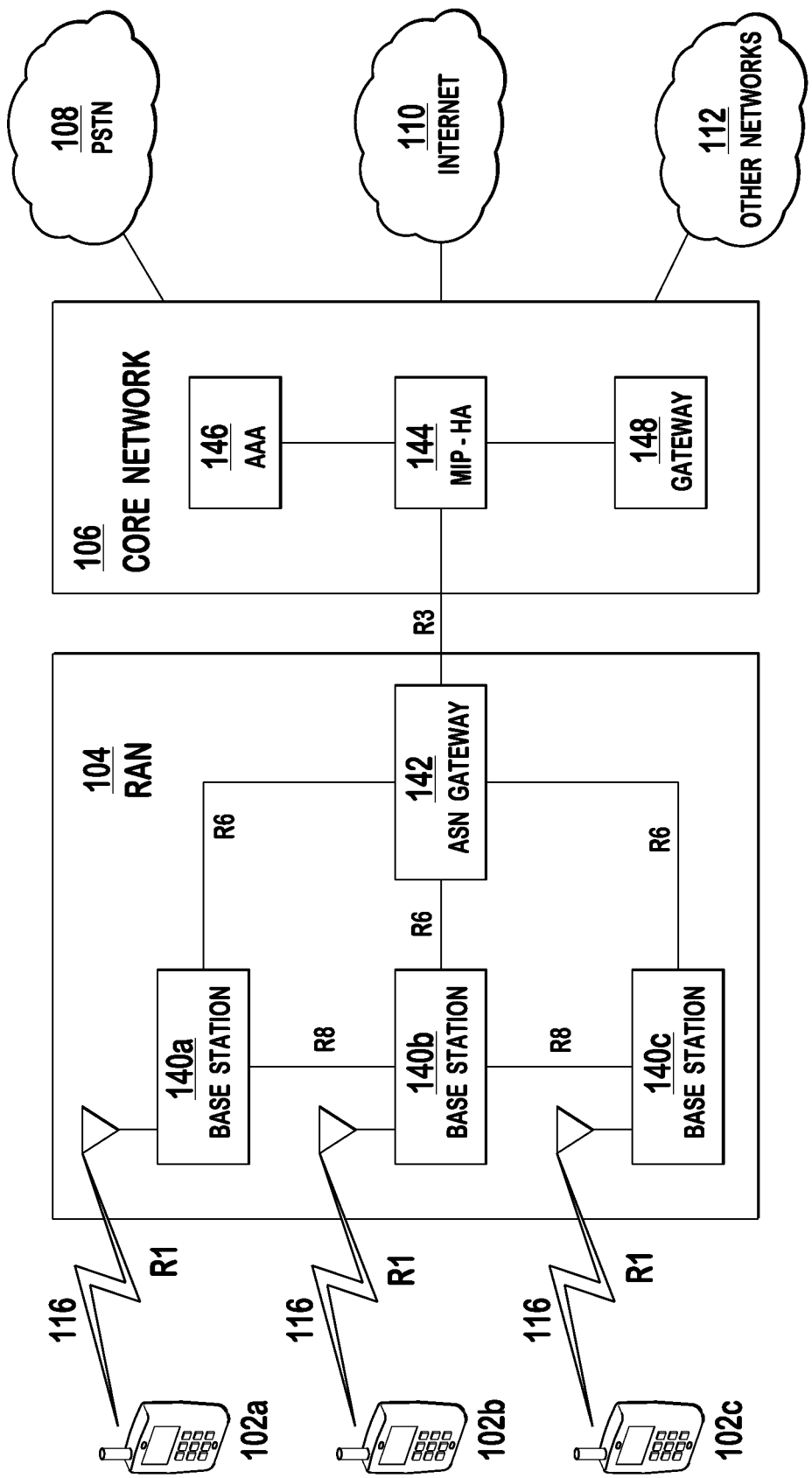
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 102c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

When referred to hereinafter, the term transmitter may mean a WTRU, a station (STA), a base station, a node B, or an access point (AP), among others. Further, when referred to hereinafter, the term receiver may mean a WTRU, an STA, a base station, a node B, or an AP, among others. Further, the transmitter or the receiver may communicate using any communications protocol including, but not limited to, an Institute for Electrical and Electronics Engineers (IEEE) 802 communications protocol, such as 802.11n, 802.11ac, 802.11af, or 802.11ah, among others. The transmitter or the receiver may also operate in any spectrum including, but not limited to, a television (TV) whitespace spectrum or a sub-1 gigahertz (GHz) spectrum.

Preambles are widely used in communications systems. A preamble may be transmitted stand-alone, (i.e., without a subsequent data transmission), or may be a header for a data transmission. The preamble allows for training a receiver to obtain information about channel conditions between a transmitter and the receiver, and thereby improved reception of subsequent data transmissions (for example, user data) is facilitated. In addition to training the receiver, a preamble may be used for sending control information to the receiver that may be necessary for reception of subsequent data transmissions.

FIG. 2 shows a preamble for a data transmission. In FIG. 2, the preamble 201 is transmitted prior to a data transmission 202. The preamble 201 may include training symbols that may be used for automatic gain control (AGC), timing and frequency acquisition, or channel estimation by the receiver. Furthermore, the training symbols may be used for frequency or time synchronization between the transmitter and the receiver.

In addition to the training symbols, the preamble may include dedicated bits that carry control information to the receiver. The dedicated bits may indicate to the receiver a transmission bandwidth, modulation or coding information, beamforming information, or space-time coding information.

As may be recognized, for proper communication between a transmitter and a receiver, a communications protocol may define a preamble for use in the communications protocol. A communications protocol may define the training symbols of the preamble and the meaning of the dedicated bits of the preamble. For example, the transmission protocol may define the length of the preamble (in bits, bytes, or symbols), the time or frequency resources used for transmission of the preamble, the encoding or modulation of the preamble, or the interpretation of the dedicated bits of the preamble. A transmitter or a receiver that is compliant with the communications protocol is aware of the manner in which the preamble is defined and may, therefore, successfully interpret and utilize the preamble.

As communications protocols are updated in order to allow for increased data rates and very high throughput (VHT) or enable usage of additional frequency bandwidths, preambles may also be updated according to the requirements of the communications protocols. Furthermore, transmitters and receivers using the communications protocols are required to be updated in order to be compliant with the latest communications protocols and in order to receive and properly process preambles of the communications protocols. However, it may be desirable for a communications protocol to allow legacy transmitters and receivers, (i.e., transmitters and receivers that are not compliant with the updated communications protocol), to communicate using the updated communications protocols.

A mixed format preamble may be used to allow legacy transmitters and receivers to communicate using the updated communications protocols. The mixed format preamble has both a legacy portion for use by legacy transmitters and receivers and a non-legacy portion for use by non-legacy transmitters and receivers. The non-legacy portion of the preamble is referred to herein as a very high throughput (VHT) portion. Furthermore, a transmitter or a receiver that is compliant with the updated communications protocols is referred to herein as a VHT transmitter or a VHT receiver or a non-legacy transmitter or a non-legacy receiver.

FIG. 3A shows a mixed format preamble 300. The mixed format preamble 300 comprises a legacy portion 311 and a VHT portion 312. The legacy portion 311 of the mixed format preamble 300 may comprise training fields and control information fields for use by legacy receivers. Legacy receivers may process the legacy portion 311 of the mixed format preamble 300 and may subsequently be able to interpret the VHT portion 312 using information provided in the legacy portion 311. The VHT portion 312 of the mixed format preamble 300 may comprise training fields and control information fields for use by non-legacy receivers or VHT receivers. Non-legacy receivers or VHT receivers may ignore or skip the legacy portion 311 and only use the VHT portion 312 of the mixed format preamble 300.

FIG. 3B shows an example of a mixed format preamble. The mixed format preamble 300 comprises a legacy portion 311 and a VHT portion 312. The legacy portion 311 comprises a legacy short training field (STF), referred to herein as L-STF 321, a legacy long training field (LTF), referred to herein as L-LTF 322, and a legacy signal (SIG) field, referred to herein as L-SIG 323. The VHT portion 312 comprises a first VHT SIG field, referred to herein as VHT-SIG-A 324, and a second VHT SIG field, referred to herein as VHT-SIG-B 327, an STF, referred to herein as VHT-STF 325, and one or more LTFs, referred to herein as VHT-LTFs $326_{1-N}$ and collectively referred to hereinafter as VHT-LTFs 326.

In the legacy portion 311 of the mixed format preamble 300, L-STF 321 comprises one or more short training symbols and may be used for AGC and timing and frequency acquisition by a legacy receiver. Further, L-LTF 322 comprises one or more long training symbols and may be used for channel estimation by a receiver. L-SIG 323 may include dedicated bits that signal to a receiver control information, such as bandwidth information, modulation or coding information, and the like.

Legacy receivers may train for reception of subsequent data transmission based on L-STF 321 and L-LTF 322. Further, legacy receivers may receive control information included in L-SIG 323.

In the VHT portion 312 of the mixed format preamble 300, VHT-STF 325 comprises one or more short training symbols and may be used for AGC and timing and frequency acquisition by a non-legacy or a VHT receiver. Further, VHT-LTFs 326 comprise one or more long training symbols and may be used for antenna calibration by a non-legacy receiver. VHT-SIG-A 324 and VHT-SIG-B 327 include control information intended for a non-legacy receiver.

Non-legacy receivers may train using the training symbols of VHT-STF 325 and VHT-LTFs 326. The non-legacy receivers may also receive control information included in VHT-SIG-A 324 and VHT-SIG-B 327. Further, non-legacy receivers may perform AGC and time and frequency acquisition based on VHT-STF 325, and antenna calibration and the like based on VHT-LTFs 326.

VHT-SIG-A 324 of the VHT portion 312 of the mixed format preamble 300 may include information intended for multiple non-legacy receivers, whereas VHT-SIG-B 327 of the VHT portion 312 of the mixed format preamble 300 may include information intended for one non-legacy receiver. For example, the multiple non-legacy receivers may acquire control information intended for the multiple non-legacy receivers from VHT-SIG-A 324, such as a group identity (ID). However, one non-legacy receiver may acquire information intended to the non-legacy receiver such as modulation and coding scheme (MCS) from VHT-SIG-B 327. Thus, the VHT portion 312 of the mixed format preamble 300 may include an Omni portion intended for multiple non-legacy receivers and a multi-user (MU) portion intended for one non-legacy receiver.

A mixed format preamble 300 is associated with an increased signaling overhead due to the inclusion of the legacy portion 311. An alternative to the signaling overhead of the mixed format preamble 300 is a Greenfield preamble. A Greenfield preamble does not include a legacy portion and instead includes only a VHT portion for use by non-legacy receivers or VHT receivers. Because the Greenfield preamble does not include a legacy portion, additional resources may be allocated to the Greenfield preamble. The additional resources allocated to the Greenfield preamble result in improved channel estimation and time and frequency acquisition, among other benefits. For example, the Greenfield preamble may include STFs and LTFs having longer training symbols than a mixed format preamble without adding additional overhead. Further, the STFs and LTFs of the Greenfield preamble may have longer guard intervals than a counterpart mixed format preamble.

Figure 4A:
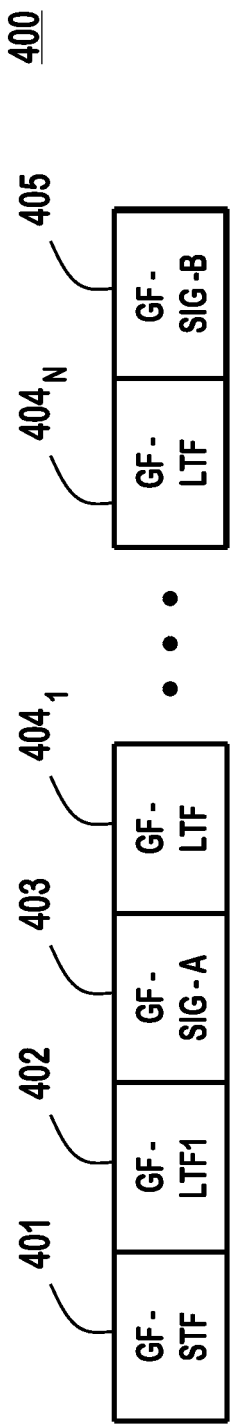
FIG. 4A shows a Greenfield preamble.

FIG. 4A shows a Greenfield preamble. The Greenfield preamble 400 comprises a Greenfield (GF) STF (GF-STF) 401, a first GF LTF, referred to herein as GF-LTF1 402, and additional GF LTFs, referred to herein as GF-LTFs $404_{1-N}$ and collectively referred to hereinafter as GF-LTFs 404, and singularly referred to hereinafter as GF-LTF $404_i$. GF-LTFs 404 may be data or expansion LTFs. Further, the Greenfield preamble 400 also comprises a first SIG field, referred to herein GF-SIG-A 403, and a second SIG field, referred to herein as GF-SIG-B 405.

GF-STF 401, GF-LTF1 402, and GF-SIG-A 403 may be intended for multiple non-legacy receivers, and thus may form an Omni portion of the Greenfield preamble 400. On the other hand, GF-LTFs 404 and GF-SIG-B 405 may be intended for one or more specific non-legacy receivers, and thus may form an MU portion of the Greenfield preamble 400.

GF-STF 401 may comprise one or more short training symbols and may be used for AGC and timing and frequency acquisition by a non-legacy receiver, and a non-legacy receiver may perform AGC and timing and frequency acquisition based on GF-STF 401.

Further, GF-LTF1 402 may comprise one or more long training symbols and may be used for channel estimation by a non-legacy receiver, and a non-legacy receiver may perform channel estimation based on GF-LTF1 402.

GF-SIG-A 403 may include dedicated bits that signal control information to multiple non-legacy receivers. The multiple non-legacy receivers may receive the control information, such as group ID, from GF-SIG-A 403. Further, GF-SIG-A 403 may provide an indication as to whether the Greenfield preamble 400 is an MU preamble or an SU preamble. A non-legacy receiver may know whether to receive or process GF-SIG-B 405 of the MU portion of the Greenfield preamble 400 based on the indication in GF-SIG-A 403. Further, in contrast to GF-SIG-A 403, GF-SIG-B 405 includes information intended for a subset of one or more specific non-legacy receivers of the multiple receivers, such as modulation and coding scheme (MCS) information of subsequent data transmissions.

GF-LTFs 404, on the other hand, comprise long training symbols and may be used for additional training of a non-legacy receiver, such as antenna calibration.

Referring to GF-STF 401 of the Greenfield preamble 400 in FIG. 4. GF-STF 401 may be constructed from an orthogonal frequency division multiplexing (OFDM) sequence denoted as $S_{-x,x}$, where $2x+1$ represents the number of OFDM subcarriers. Because the Greenfield preamble 400 does not include a legacy portion, additional resources for a longer OFDM sequence may be allocated to the GF-STF 401 of the Greenfield preamble 400 than used in L-STF 321 or VHT-STF 325 of the mixed format preamble 300.

For example, for usage in a 5, 10, or 20 megahertz (MHz) bandwidth, the GF-STF sequence may be described as:

$$S_{-26,26} = \frac{1}{\sqrt{2}}(0, 0, 1+j, 0, 0, 0, -1-j, 0, 0, 0, 1+j, 0, 0, 0, -1-j, 0, 0, 0,$$
$$-1-j, 0, 0, 0, 1+j, 0, 0, 0, 0, 0, 0, 0, -1-j, 0, 0, 0, -1-j, 0,$$
$$0, 0, 1+j, 0, 0, 0, 1+j, 0, 0, 0, 1+j, 0, 0, 0, 1+j, 0, 0)$$

where j represents the complex conjugate. Further, a longer $S_{-x,x}$ may be used in a 40 MHz bandwidth. For example, for a 40 MHz bandwidth, the GF-STF sequence may be defined as: $S_{-58,58}=(S_{-26,26}, 0, 0, 0, 0, 0, 0, 0, 0, 0, 0, 0, S_{-26,26})$. Further, for usage in an 80 MHz bandwidth, the GF-STF sequence may be defined as: $S_{-122,122}=(S_{-58,58}, 0, 0, 0, 0, 0, 0, 0, 0, 0, 0, 0, S_{-58,58})$, and for usage in a 160 MHz bandwidth, the GF-STF sequence may be defined as: $S_{-250,250}=(S_{-122,122}, 0, 0, 0, 0, 0, 0, 0, 0, 0, 0, 0, S_{-122,122})$.

A time domain waveform having a 0.8 microseconds (µs) period may be obtained from the sequence $S_{-x,x}$ by applying an inverse fast Fourier transform (IFFT) and adding a cyclic prefix. The time domain waveform may be repeated ten times to form a GF-STF 401 with a duration of 8 µs. It is noted that a GF-STF 401 with a duration of 16 µs may be obtained by utilizing half-clocking and a GF-STF 401 with a 32 µs duration may be obtained by utilizing quarter-clocking.

Table 1 shows a tone scaling factor and duration of GF-STF 401 for various bandwidths. It is noted that the tone scaling factor and GF-STF 401 duration may be similarly obtained for any other bandwidth, such as 1, 2, 4, or 8 MHz.

TABLE 1

Tone scaling factor and duration of GF-STF for various bandwidths

| | Bandwidth (MHz) | | | | | |
|---|---|---|---|---|---|---|
| | 5 | 10 | 20 | 40 | 80 | 160 |
| Tone scaling factor | 12 | 12 | 12 | 24 | 48 | 96 |
| GF-STF duration (32 µs) | 32 | 16 | 8 | 8 | 8 | 8 |

Referring to GF-LTF1 402 of the Greenfield preamble 400 of FIG. 4, GF-LTF1 402 may be 8 µs in duration, as compared with a GF-LTF 404$_i$ of 4 µs in duration. Further, GF-LTF1 402 may comprise two periods of long training symbols preceded by a double length 1.6 µs cyclic prefix. The usage of two periods of long training symbols and a double length cyclic prefix is facilitated by the fact that the Greenfield preamble 400 does not include a legacy portion, as compared to a mixed format preamble 300 and, therefore, more resources may be allocated to the Greenfield preamble 400 without incurring overhead.

Table 2 shows a tone scaling factor, GF-LTF1 duration, and guard interval (GI) time for various bandwidths. It is noted that the tone scaling factor, GF-LTF1 duration, and GI time may be similarly obtained for any other bandwidth, such as 1, 2, 4, 8, or 16 MHz.

TABLE 2

Tone scaling factor, GF-LTF1 duration, and GI time for various bandwidths.

| | Bandwidth (MHz) | | | | | |
|---|---|---|---|---|---|---|
| | 5 | 10 | 20 | 40 | 80 | 160 |
| Tone scaling factor | 56 | 56 | 56 | 114 | 242 | 484 |
| GF-LTF1 Duration (32 µs) | 32 | 16 | 8 | 8 | 8 | 8 |
| GI time | 6.4 | 3.2 | 1.6 | 1.6 | 1.6 | 1.6 |

It is worth noting that the training symbols for GF-LTF1 402 may be half-clocked for 5 MHz operation and quarter-clocked for 10 MHz operation.

As described herein, in multiple input multiple output (MIMO) communications and communications protocols employing MIMO, a preamble may include information intended for multiple receivers, whereby the preamble is said to include a multi-user (MU) portion or the preamble is said to be an MU preamble. Further, a preamble may be intended for a single receiver, whereby the preamble is said to be an SU preamble. Accordingly, the Greenfield preamble 400 may be used as the basis for an SU preamble, as described with reference to FIG. 4B.

Figure 4B:
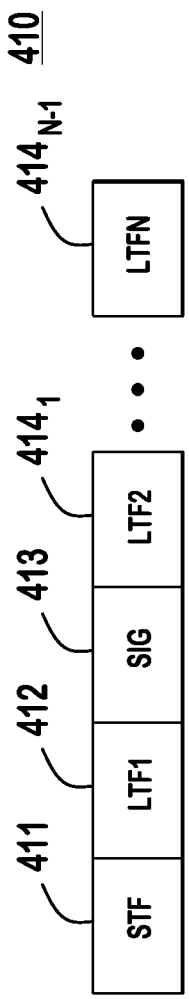
FIG. 4B shows an single user preamble in accordance with the Greenfield preamble.

FIG. 4B shows an SU preamble in accordance with the Greenfield preamble. The SU preamble 410 comprises STF 411, a first LTF, denoted LTF1 412, a signal (SIG) 413 field, and one or more additional LTFs, denoted as LTF2 414$_1$, . . . , LTFN 414$_{N-1}$ and referred to collectively hereinafter as LTFs 414.

STF 411 of the SU preamble 410 may be the same as GF-STF 401 of the Greenfield preamble 400. Further, LTF1 412 may be the same as GF-LTF1 402, SIG 413 may be the same as GF-SIG-A 403, and LTFs 414 may be the same as GF-LTFs 404 of the Greenfield preamble 400. It is noted that because an SU preamble only needs to signal control information to a single receiver, the signaling of control information may consolidated in SIG 413 and, thus, there is no need for an additional MU SIG field, such as GF-SIG-B 405 of the Greenfield preamble 400.

Further, the Greenfield preamble 400 may also be used as the basis for an MU preamble, as described with reference to FIG. 4C. Unlike the SU preamble 410 that is intended for a specific receiver, an MU preamble may include a first portion intended for multiple receivers, referred to herein as an Omni portion, and a second portion intended for a subset of the multiple receivers, referred to herein as an MU portion.

Figure 4C:
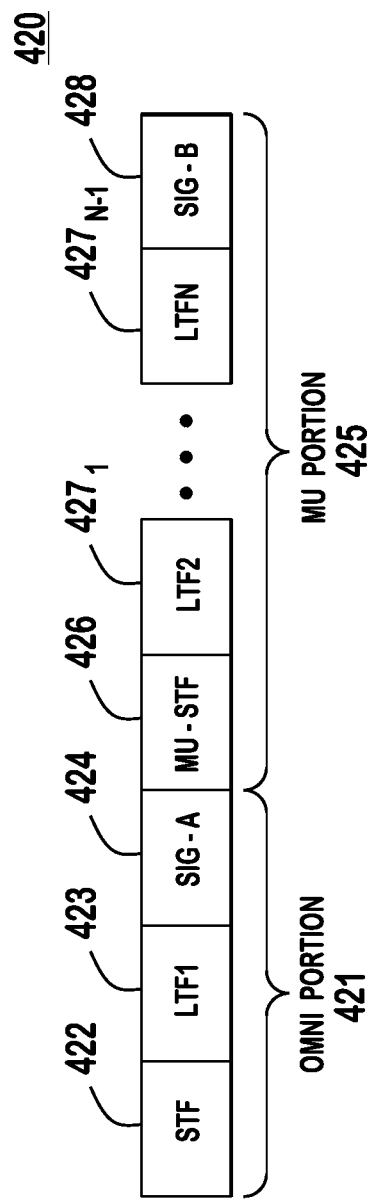
FIG. 4C shows an multi user preamble in accordance with the Greenfield preamble.

FIG. 4C shows an MU preamble in accordance with the Greenfield preamble. The MU preamble 420 comprises an Omni portion 421 and an MU portion 425. The Omni portion 421 comprises an STF 422, a first LTF, referred to herein as LTF1 423, and a first SIG field, referred to herein as SIG-A 424. Further, STF 422 may be the same as GF-STF 401 of the Greenfield preamble 400, LTF1 423 may be the same as GF-LTF1 402 of the Greenfield preamble 400, and SIG-A 424 may be the same as GF-SIG-A 403 of the Greenfield preamble 400.

As described herein, the Omni portion 421 of the MU preamble 420 is intended for multiple receivers and the multiple receivers may receive and utilize the Omni portion 421 of the MU preamble 420 as described herein. For example, the multiple receivers may perform AGC and timing and frequency acquisition based on STF 422 of the Omni portion 421, and channel estimation based on LTF1 423 of the Omni portion 421. Further, the multiple receivers may acquire control information intended for the multiple receivers, such as a group identity (ID), from SIG-A 424 of the Omni portion 421 of the MU preamble 420.

The MU portion 425 of the MU preamble 420 comprises an additional STF, referred to herein as MU-STF 426, one or more additional LTFs, denoted as LTF2 $427_1$, ..., LTFN $427_{N-1}$ and referred to collectively herein as LTFs 427, and a second SIG field, referred to herein as SIG-B 428.

LTFs 427 of the MU portion may be the same as GF-LTFs 404 of the Greenfield preamble 400, and SIG-B 428 may also be the same as GF-SIG-B 405 of the Greenfield preamble 400.

However, although not included in the Greenfield preamble 400, MU-STF 426 may alternatively be included in the MU preamble 420. MU-STF 426 may comprise short training symbols and may be used for performing finer AGC, and time and frequency acquisition than performed based on STF 422 of the Omni portion 421.

As described herein, a Greenfield preamble 400 may be used by non-legacy receivers or VHT receivers. Further, a mixed format preamble 300 may be used by both VHT receivers and legacy receivers.

Figure 5:
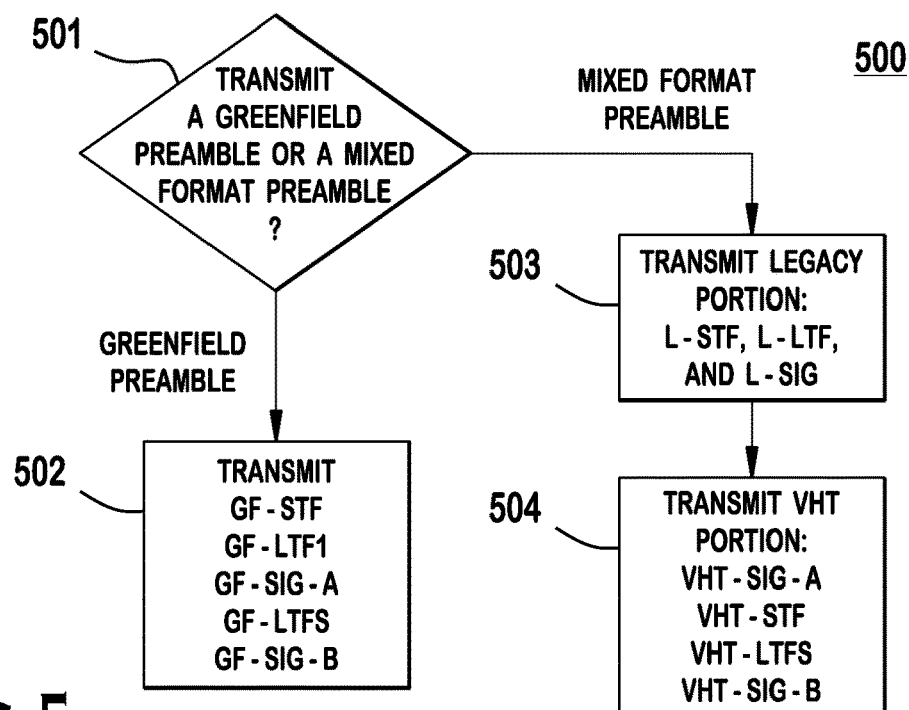
FIG. 5 shows a method for preamble transmission.

FIG. 5 shows a method for preamble transmission. In the method 500, a transmitter determines whether to transmit a Greenfield preamble 400 or a mixed format preamble 300 501. If the transmitter determines that a Greenfield preamble 400 is to be transmitted, then the transmitter transmits the Greenfield preamble 400 comprising GF-STF 401, GF-LTF1 402, GF-SIG-A 403, GF-LTFs 404, and GF-SIG-B 405 502. If the transmitter determines that a mixed format preamble 300 is to be transmitted, then the transmitter transmits the legacy portion 311 of the mixed format preamble 300 comprising L-STF 321, L-LTF 322, and L-SIG 323 503. The transmitter also transmits the VHT portion 312 of the mixed format preamble 300 comprising VHT-SIG-A 324, VHT-STF 325, VHT-LTFs 326, and VHT-SIG-B 327 504.

A receiver may be either a VHT receiver that is capable of processing both a VHT preamble and a mixed format preamble or a legacy receiver that is capable of processing only a mixed format preamble.

Figure 6:
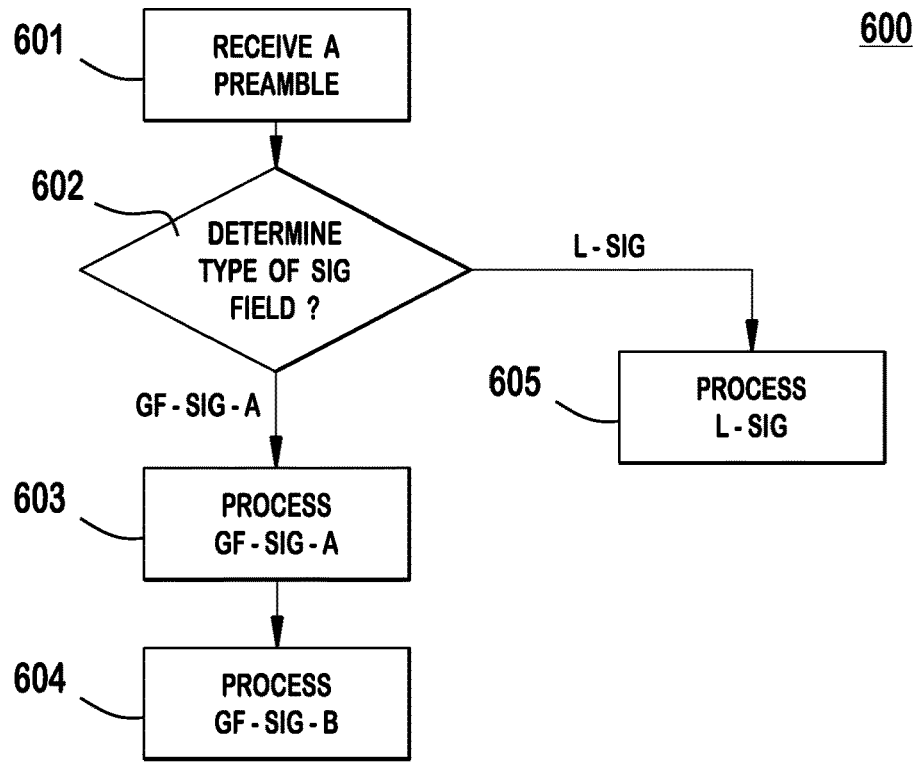
FIG. 6 shows a method for processing a preamble.

FIG. 6 shows a method for processing a preamble. In the method 600, a receiver receives a preamble 601. The receiver determines the type of SIG field of the preamble 602. If the receiver determines that the SIG field is a GF-SIG-A 403, then the receiver processes the GF-SIG-A 403 603. The receiver also processes GF-SIG-B 405 604. If, on the other hand, the receiver determines that the SIG field is an L-SIG 323, the receiver processes the L-SIG 323 605.

When referred to hereinafter, a preamble may mean any preamble, such as mixed format preamble 300, Greenfield preamble 400, SU preamble 410, or MU preamble 420. Further, when referred to hereinafter, an STF may mean any STF of any preamble, such as L-STF 321 or VHT-STF 325 of mixed format preamble 300, GF-STF 401 of Greenfield preamble 400, STF 411 of SU preamble 410, or STF 422 or MU-STF 426 of MU preamble 420.

Additionally, when referred to hereinafter, an LTF may mean any LTF of any preamble, such as L-LTF 322 of mixed format preamble 300, or GF-LTF1 402 of Greenfield preamble 400, LTF1 412 of SU preamble 410, or LTF1 423 of MU preamble 420. Furthermore, when referred to hereinafter a SIG field may mean any SIG field of a preamble, such as L-SIG 323, VHT-SIG-A 324, or VHT-SIG-B 327 mixed format preamble 300, GF-SIG-A 403 or GF-SIG-B 405 of Greenfield preamble 400, SIG 413 field of SU preamble 410, or SIG-A 424 or SIG-B 428 of MU preamble 420. Additionally, when referred to hereinafter, a receiver may mean a legacy receiver, or a non-legacy or VHT receiver.

A preamble may include an indication as to whether the preamble is an SU preamble intended for a specific receiver or an MU preamble intended for multiple receivers.

The SIG field may include one or more bits or a field to indicate whether the preamble is an SU preamble or an MU preamble, and a receiver may determine from the SIG field whether the preamble is an SU preamble or an MU preamble. If the receiver determines that the preamble is an MU preamble, the receiver may obtain control information (for example, group ID or $N_{STS}$) related to multiple receivers from the SIG field. Further, the receiver may obtain information specific to the receiver (for example, MCS) from a SIG field of an MU portion of the preamble.

If, on the other hand, the receiver determines that the preamble is an SU preamble, the receiver may obtain control information (for example, MCS or $N_{STS}$) specific to the receiver from the SIG field.

In another embodiment, an STF or an LTF of a preamble may be used to indicate whether the preamble is an SU preamble or an MU preamble. A sequence or subcarrier mapping of the STF or LTF may be used to indicate whether the preamble is an SU preamble or an MU preamble. When an STF is used to indicate whether the preamble is an SU preamble or an MU preamble, a receiver may be aware of a first STF sequence or subcarrier mapping used to indicate an SU preamble and a second STF sequence or subcarrier mapping used to indicate an MU preamble. A receiver may receive an STF and may apply frequency domain correlation to the received STF and the first STF sequence, and may also apply frequency domain correlation to the received STF and the second STF sequence, in order to determine whether the preamble is an SU preamble or an MU preamble.

Similar to determining whether the preamble is an SU preamble or an MU preamble based on the STF, a receiver may determine whether the preamble is an SU preamble or an MU preamble based on an LTF.

In another embodiment, cyclic redundancy check (CRC) masking of a SIG field may be performed to indicate whether the preamble is an SU preamble or an MU preamble. As may be recognized, error protection for a SIG field may be provided through a CRC having a length of L bits and denoted as $C_{L-1}, C_{L-2}, \ldots, C_0$. The CRC may be masked with a sequence $x_{L-1}, x_{L-2}, \ldots, x_0$ to indicate whether the preamble is an SU preamble or an MU preamble. For example, if the CRC is masked with sequence $\{0, 0, \ldots, 0\}$, then an SU preamble is indicated, whereas if the CRC is masked with sequence $\{1, 1, \ldots, 1\}$, then an MU preamble is indicated, and vice-versa. It is noted that CRC masking may be performed by applying a modulo 2 operation to the respective bit positions of the CRC and the sequence.

A receiver may receive the preamble and calculate L CRC bits based on the SIG field. The receiver may further determine whether the preamble is an SU preamble or an MU preamble by comparing the received CRC bits with the calculated CRC bits. It is noted that the masked CRC may be included in the SIG field or elsewhere in the preamble (for example, in a SERVICE field in IEEE 802.11 communications).

Further, a CRC mask may only be associated with a particular transmission mode and the presence of the CRC mask may indicate the transmission mode. For example, a CRC mask may only be associated with a 1 MHZ transmission mode.

In a further embodiment, tail bits that terminate a convolutional code for a SIG field may be used to indicate whether a preamble is an MU preamble or an SU preamble. For example, the SIG field may be terminated with the tail bits [0 0 0 0 0 0] to indicate that the preamble is an SU preamble, or the SIG field may be terminated with the tail bits [1 1 1 1 1 1] to indicate that the preamble is an MU preamble. Further, in addition to indicating whether the preamble is an MU preamble or an SU preamble, tail bits may carry additional information bits. For example, two bits of information may be carried by choosing among four different termination sequences (e.g., termination sequences [0 0 0 0 0 0], [1 1 1 0 0 0], [0 0 0 1 1 1] or [1 1 1 1 1 1]). In addition, the termination sequences may be chosen to maximize a Hamming distance between resultant codewords. It is noted that three bits may indicate eight possible termination states, whereas four bits may indicate 16 possible termination states up to a maximum of 6 bits, which may be equivalent to a code that is not terminated.

A receiver may perform convolutional decoding to decode the SIG field. Further, the convolutional decoding may be performed assuming that the tail bits are either [0 0 0 0 0 0] or [1 1 1 1 1 1]. After convolutional decoding is performed, a receiver may utilize a maximum likelihood function to determine whether the tail bits of the SIG field are [0 0 0 0 0 0] or [1 1 1 1 1 1], and thus determine whether the preamble is an MU preamble or an SU preamble. Similarly, when more than one bit of information is indicated using the tail bits, a decoding process may choose the best state to trace back from given possible alternatives. In the example above, a convolution decoder may choose the best metric from the four states of [0 0 0 0 0 0], [1 1 1 0 0 0], [0 0 0 1 1 1], and [1 1 1 1 1 1] in order to perform tracing back. It is noted that if tail biting is utilized in an encoder, an appropriate tail-biting decoder may be required to be used in a decoder.

In one embodiment, the SIG field of a preamble may include an indication of an operating bandwidth or a mode of operation for preamble transmission or data transmission. For example, the SIG field may indicate whether a 1 MHz bandwidth or a 2 MHz bandwidth or mode of operation is used. A bit in the SIG field may be used to indicate the operating bandwidth or the mode of operation.

A receiver that is capable of operating in either a first bandwidth or a second bandwidth may determine the bandwidth based on the SIG field and the receiver may appropriately process a remainder of the preamble and subsequent data transmissions based on the determined bandwidth (i.e., the receiver may perform detection, or frequency and time synchronization, among others). For example, in IEEE 802.11 communications, if the SIG field indicates 1 MHz bandwidth on either or both an upper or lower 1 MHz band, a receiver may process a preamble or a data transmission according to the 1 MHz bandwidth on either or both of the upper or the lower 1 MHz bands. Further, subcarrier demapping may be performed according to a 1 MHz location of received preamble or data and the receiver may set a Network Allocation Vector (NAV) for either or both of the upper or the lower 1 MHz bands and may ignore a packet based on configurations.

Further, a receiver that is only capable of operating in the first bandwidth may determine that the second bandwidth is used and may operate accordingly. For example, the receiver may cease receiving on the second bandwidth in order to conserve battery life.

In another embodiment, the SIG field of a preamble may include an indication of whether packet aggregation is performed. Packet aggregation may be utilized for reducing signaling overhead when available bandwidths are relatively small. Further, packet aggregation results in gain when a large number of receivers or transmitters are available.

The SIG field may include an indication that a preamble or a data transmission is aggregated, an indication that an aggregated preamble or an aggregated data transmission is intended for one or more specific receivers or multiple receivers, or information for processing or de-aggregation of data transmissions, such as an order of receivers or timing information.

Aggregation may be performed over contiguous or non-contiguous bandwidths. Further, the contiguous or non-contiguous bandwidths may have the same or different bandwidths. For example, any 5, 10, 40, or 80 MHz bandwidth may be aggregated with any other 5, 10, 40, or 80 MHz bandwidth.

In one embodiment, the SIG field of a preamble may indicate MCS information for a subchannel (i.e., on a subchannel basis). The MCS information may include the modulation or coding utilized for each subchannel within a transmission bandwidth. For example, the MCS information may indicate a modulation, a coding rate, or a binary convolutional code (BCC) or a low density parity check (LDPC) coding indicator. A receiver may receive MCS information for each subchannel and may demodulate or decode a transmission over each subchannel based on the MCS information.

It is noted that subchannels in a transmission bandwidth or channel width may be non-contiguous or contiguous. Further, multiple contiguous or non-contiguous subchannels may be used simultaneously for wide-bandwidth transmission or multichannel transmission. Further, each of the subchannels may have its own MCS that is indicated using the SIG field.

For example, in a transmission bandwidth or channel width of 8 MHz, a subchannel may have a width of less than 8 MHz. Channel conditions, such as interference, of a first subchannel may be different than the channel conditions of a second subchannel. Further, when the channels are non-contiguous, the difference between the channel conditions of the first subchannel and the second subchannel is expected to be larger than when the first subchannel and the second subchannel are contiguous. A subchannel-specific MCS may take into account signal-to-noise ratio (SNR) or bit error rate (BER) conditions for the subchannel or other subchannels.

In one embodiment, the SIG of an Omni portion of a preamble (for example, GF-SIG-A 403 of Greenfield preamble 400, or SIG-A 424 of MU preamble 420) may include MCS information on a subchannel basis that is intended for multiple users (for example, a BCC or LDPC coding indicator for multiple users). However, the SIG field of an MU portion of the preamble (for example, GF-SIG-B 405 of Greenfield preamble 400, or SIG-A 428 of MU preamble 420) may include MCS information on a subchannel basis intended for a subset of users (for example, a modulation and coding rate for a specific user).

In an embodiment, a SIG field of a preamble may include an indication of transmit power control information. Further, a receiver may adjust its transmission power according to the power control information included in the SIG field. The SIG field may indicate a power up command indicating that a transmission power should be increased, a power down command indicating that a transmission power should be decreased, or an absolute power level indicating that a transmission power of the receiver should be adjusted to match the absolute power level.

Additionally, a SIG field of an Omni portion of a preamble (for example, SIG-A 424 of MU preamble 420 or GF-SIG-A 403 of Greenfield preamble 400) may include a reference transmission power level intended for multiple receivers, whereas a SIG field of an MU portion of a preamble (for example, SIG-B 428 of MU preamble 420 or GF-SIG-B 405 of Greenfield preamble 400) may include an offset transmission power level relative to the reference transmission power level. The offset transmission power level may be intended for one or more specific receivers of the MU portion of the preamble and the specific receiver may adjust its transmission power level to match a power level that is the aggregate of both the reference transmission power level and the offset transmission power level.

Transmit power control information may include a quantized representation of an absolute power level, a quantized representation of power up or power down indication, a power difference between two measurement intervals for a specific receiver, a power difference between two receivers, or a power difference between a transmitter and a receiver.

To improve time and frequency acquisition and channel estimation by a receiver, a midamble or a postamble may be utilized in a transmission as described with reference to FIG. 7.

Figure 7:
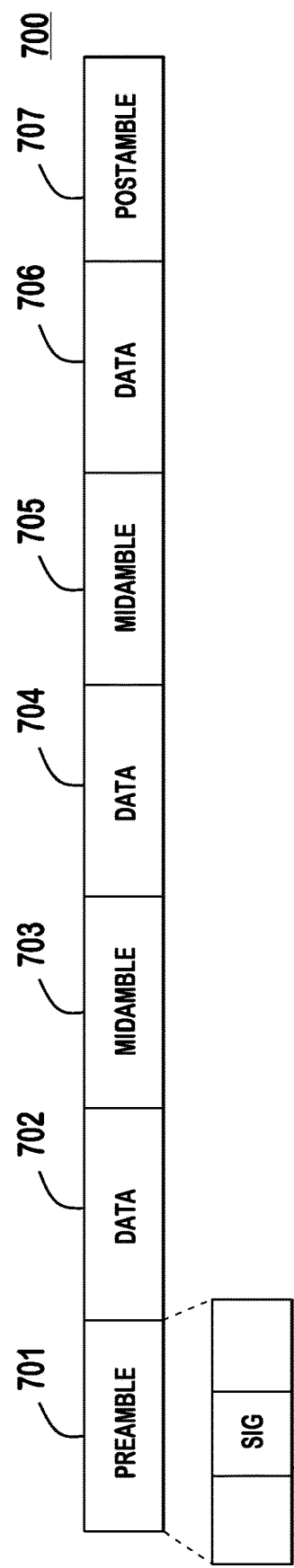
FIG. 7 shows a transmission including a preamble, midamble, and a postamble.

FIG. 7 shows a transmission including a preamble, midamble, and a postamble. The transmission 700 comprises a preamble 701, where the preamble 701 includes a SIG field 701$_A$, as described herein. The transmission also includes data fields 702, 704, 706 which may include any data that is intended for a receiver, a first midamble 703, a second midamble 705 (collectively referred to herein as midambles 703, 705), and a postamble 707. The midambles 703, 705 are placed amidst data fields 702, 704, 706 and may comprise STFs or LTFs that may be used by the receiver for time and frequency acquisition, channel estimation, and the like. The midambles 703, 705 may be necessary when the aggregate of the length of data fields 702, 704, 706 is large and the time and frequency acquisition and channel estimation acquired by the receiver based on the preamble 701 have become stale or non-applicable to current communications conditions.

To achieve diversity, the preamble 701 and the midambles 703, 705 may each use different or orthogonal subcarriers. Further, if available subcarriers are limited, the preamble 701 or the midambles 703, 705 may re-use the subcarriers. Additionally, the preamble 701 and the midambles 703, 705 may be transmitted on different antennas or on orthogonal antennas, or using a spatially orthogonal covering code. Further, each data field 702, 704, 706 may have an MCS associated with the data field 702, 704, 706 and the MCSs may be the same or different for the data fields 702, 704, 706.

The SIG field 701$_A$ of the preamble 701 may include an indication of the presence of or a location of a midamble (for example, first midamble 703 or second midamble 705) or the postamble 707 in a transmission 700. The location may be indicated by a symbol offset to the midamble, a number of symbols between the midambles 703, 705, time between midambles 703, 705, or an index to a pre-determined midamble location (for example, every nth OFDM symbol). Further, the indication of a location of the midamble may be determined based on an antenna index or an antenna number.

The SIG field 701$_A$ of the preamble 701 may also include an indication of a format of the midamble, an index to a format of each midamble, or an index to the format of all preambles. The SIG field 701$_A$ of the preamble 701 may also include an indication of a subcarrier pattern of a midamble. Alternatively, a subcarrier pattern may be implicitly indicated using a location of the midamble.

In an alternative embodiment, midambles 703, 705 may each have a subsequently transmitted midamble SIG (MSIG) field. Each MSIG field of the midambles 703, 705 may indicate the length of subsequent data fields 704, 706, respectively. In addition, the length of data field 702 may be indicated by the SIG field 701$_A$ of the preamble 701. Furthermore, SIG field 701$_A$ or an MSIG field associated with midambles 703, 705 may indicate the MCS associated with data fields 702, 704, 706.

A receiver may interpolate channel estimates obtained based on preamble 701, midambles 703, 705, or postamble 707, and may utilize the interpolated channel estimates to process data fields 702, 704, 706. For example, a receiver may interpolate channel estimates obtained based on midambles 703, 705 and utilize the interpolated channel estimates to process data field 704 that is received between the midambles 703, 705. The interpolation may allow for more robust channel estimation.

Further, a receiver may obtain a Doppler estimate of a channel based on preamble 701, midambles 703, 705, or postamble 707. The receiver may also request increasing or decreasing the number of midambles based on the Doppler estimate. The Doppler estimate may be sent to a transmitter and may be used to determine whether to increase or decrease the number of midambles sent to the receiver. Doppler estimates may also be used for formation of a group of receivers, whereby the group of receivers may have requested the same number of midambles.

In another embodiment, the SIG field of a preamble may indicate usage of a short guard interval (GI) for a subsequent data transmission. The SIG field may indicate usage of a short GI using a bit indicator. Additionally, short GI usage may be indicated using a polarity of the pilot tone values of the SIG field. For example, where a SIG field has four pilot tones, pilot tone values [1 1 1 −1] may indicate the absence of a short GI, whereas pilot tone values [−1 −1 −1 1] may indicate the presence of a short GI.

A receiver may process the SIG field and may determine the pilot tone values of the SIG field using, for example, a mean squared error (MSE) metric or another metric. The receiver may further determine the presence or absence of a short GI based on the pilot tone values and may process a data transmission accordingly. It is noted that when multiple SIG fields are used to indicate usage of a short GI, the MSE or any other metric may be averaged to increase robustness.

Figure 8:
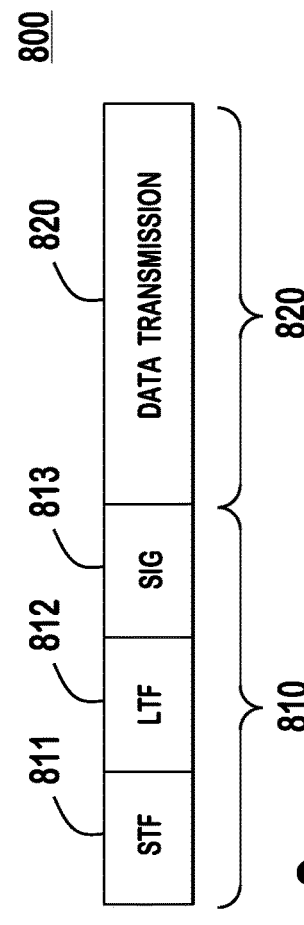
FIG. 8 shows a preamble indicating a short guard interval and a data transmission.

FIG. 8 shows a preamble indicating a short GI and a data transmission. The preamble 810 comprises an STF 811, an LTF 812, and a SIG field 813 which indicates usage of a short GI. Because of the usage of a short GI, the SIG field 813 is followed by a data transmission 820.

In an embodiment, the SIG field of a preamble may indicate whether beamforming is utilized on a subsequent data transmission and whether the preamble is a beamforming preamble. Further, when beamforming is utilized, the beamforming preamble may include an additional STF for beamforming, an additional LTF for beamforming, or both an additional STF and an additional LTF for beamforming.

Figure 9:
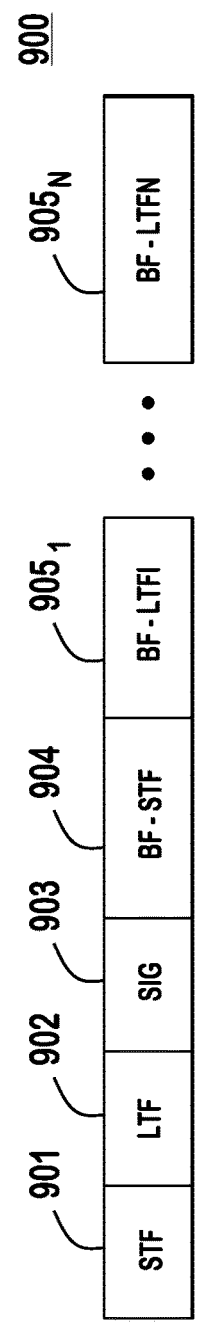
FIG. 9 shows a beamforming preamble.

FIG. 9 shows a beamforming preamble. The beamforming preamble 900 comprises an STF 901, an LTF 902, and a SIG field 903. In addition, the beamforming preamble 900 includes a beamforming STF (BF-STF) 904, and one or more beamforming LTFs (BF-LTFs), denoted BF-LTF1 $905_1, \ldots$, BF-LTFN $905_N$ and referred to collectively herein as BF-LTFs 905. BF-STF 904 may be used for AGC correction, whereas BF-LTFs 905 may be used for improved frequency offset and channel estimation by a receiver. The SIG field 903 of the beamforming preamble 900 may include a one-bit indicator for beamforming. It is noted that BT-STF 904 may be replaced by a beamforming LTF, for example, BF-LTF, and a receiver may perform AGC and time and frequency acquisition based on the BT-LTF.

In an embodiment, the SIG field of a preamble may include a length field indicating the length of a data transmission in bits, bytes, or OFDM symbols, or in multiples of bits, bytes, or OFDM symbols (for example, in pairs of OFDM symbols). For example, the length field may comprise n bits and may, thus, indicate any length of the data transmission field between 0 and $2^n-1$ bits, bytes, or OFDM symbols, or multiples of bits, bytes, or OFDM symbols.

Whether the length field represents the length of the data transmission in bits, bytes, or OFDM symbols, or in multiples of bits, bytes, or OFDM symbols may depend upon the modulation scheme used. Thus, when a first modulation scheme is used, the length field may represent the length of the data transmission in bits, whereas when a second modulation scheme is used, the length field may represent the length of the data transmission in OFDM symbols. Further and by way of example, the SIG field may represent the length of the data transmission in bytes only for modulation scheme MCS0-Rep2 of IEEE 802.11ah, whereas for all other IEEE 802.11ah modulation schemes, the length field may represent the length of the data transmission in OFDM symbols.

By way of yet another example, the length field of a SIG field may denote the length of a data transmission in OFDM symbols, whereby a length field of a SERVICE field of an IEEE 802.11 data transmission may indicate the length in bytes of the last OFDM symbol of the data transmission.

Whether the length field represents a length of transmission in bits or bytes may depend on an aggregation indication. For example, when the SIG field indicates that aggregation is not performed, then the length field indicates the length of the data transmission field in bytes, whereas when the SIG field indicates that aggregation is performed, then the length field indicates the length of the data transmission field in OFDM symbols. Further, in IEEE 802.11 it may be required that an aggregated medium access control (MAC) protocol data unit (AMPDU) be used when a data transmission exceeds 2047 bytes in length.

In order to allocate additional bits in the SIG field for a length field, space time block coding (STBC), which is typically indicated by one or two bits in the SIG field, may be implicitly indicated and the one or two bits used to indicate STBC may be used instead as additional bits for the length field. Furthermore, to allocate additional bits to the length field, short GI indication, aggregation indication, and $N_{STS}$ indication, which are typically indicated using bits of the SIG field, may instead be implicitly indicated and the bits that were formerly used to indicate a short GI, aggregation, and $N_{STS}$ may be used as additional bits for a length field. The modulation scheme of symbols of the SIG field may indicate a short GI, aggregation, and $N_{STS}$. For example, the modulation scheme of the first symbol of the SIG field may indicate whether STBC is performed, the modulation scheme of the second symbol of the SIG field may indicate whether a short GI is used, the modulation scheme of the third symbol of the SIG field may indicate whether aggregation is performed, and the modulation scheme of the fourth and fifth symbols of the SIG field may indicate $N_{STS}$.

In one embodiment, a preamble may be transmitted stand-alone without a subsequent data transmission in order to perform channel sounding. A SIG field of the preamble may indicate that the preamble is used for the purpose of channel sounding. The SIG field may indicate that the preamble is used for the purpose of channel sounding if the length field of the SIG field is set to zero.

In one embodiment, an STF may use every other available frequency bin in any mode of operation, such as a 1 MHz mode of operation. For example, when using every other available frequency bin, the STF may use twelve tones out of a total of twenty four tones. By using every other tone, the twelve tones of the STF may be [−12 −10 −8 −6 −4 −2 2 4 6 8 10 12]. Further, the values of the twelve tones may be [−1 −1 −1 1 1 1 −1 1 −1 −1 1 −1]*(1+i).

Using a fast Fourier transform (FFT) of size 32, the 12-tone STF has a peak-to-average power ratio (PAPR) of 2.06 decibels (dB). Further, the number of repetitions per OFDM symbol for the 12-tone STF is two and the 12-tone STF results in improved autocorrelation properties and improved packet timing detection.

In another embodiment, an STF may use every fourth available frequency bin in addition to the direct current (DC) bin in any mode of operation, such as a 1 MHz mode of operation. For example, when using every fourth available frequency bin in addition to DC bin, the STF may use seven tones out of a total of twenty four tones. The tones may be [−12 −8 −4 0 4 8 12]. Further, the values of the tones may be [−1 −1 −1 1 1 −1 1]*(1+i).

Using a fast Fourier transform (FFT) of size 32, the STF has a PAPR of 1.32 dB. Further, the number of repetitions per OFDM symbol for the STF is four. The STF has improved autocorrelation properties and improved packet timing detection.

Figure 10A:
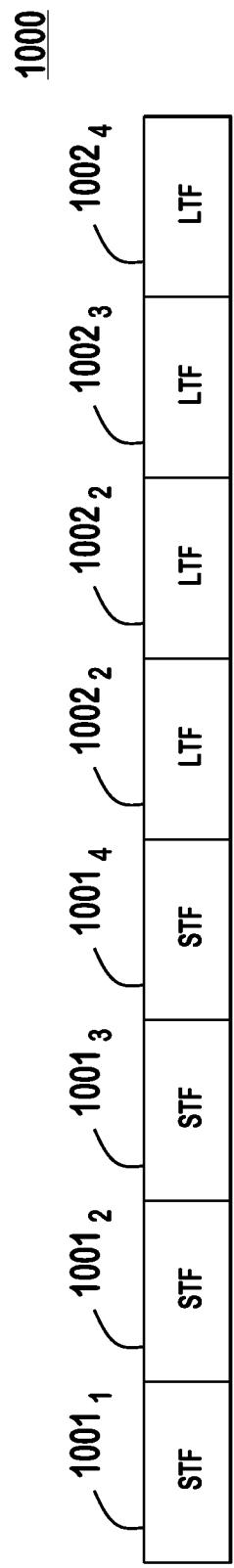
FIG. 10A shows a preamble having four 12-tone short training fields (STFs) and four long training fields (LTFs)

A preamble may be constructed using 12-tone STFs enabling robust detection, frequency and time synchronization, and channel estimation as described with reference to FIG. 10A. In the preamble of FIG. 10A, a maximum range of frequency offset estimated may be ±Δf, where Δf is frequency spacing.

FIG. 10A shows a preamble having four 12-tone STFs and four LTFs. The preamble 1000 comprises STFs $1001_{1-4}$ and LTFs $1002_{1-4}$. The STFs $1001_{1-4}$ are each 12-tone STFs and have a duration of 40 μs. The LTFs $1002_{1-4}$ are each 26-tone LTFs and have a duration of 40 μs.

In addition, a preamble may be constructed using 12-tone STFs and 6-tone STFs enabling robust detection, frequency and time synchronization and channel estimation as described with reference to FIG. 10B. The preamble of FIG. 10B enables estimation of frequency offsets of up to ±2Δf.

Figure 10B:
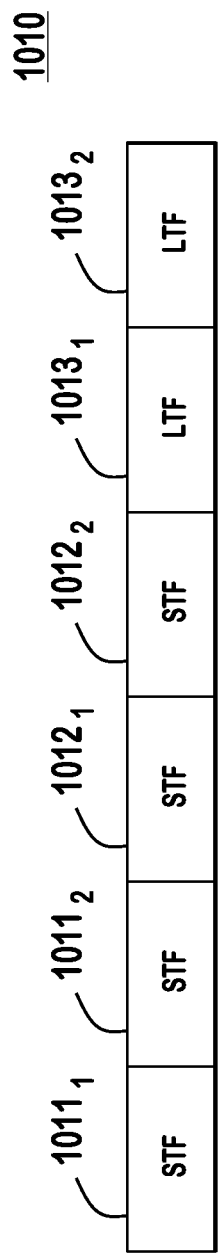
FIG. 10B shows a preamble having two 12-tone STFs, two 6-tone STFs and two LTFs.

FIG. 10B shows a preamble having two 12-tone STFs, two 6-tone STFs and two LTFs. The preamble 1010 comprises STFs $1011_{1-2}$, STFs $1012_{1-2}$ and LTFs $1013_{1-2}$. STFs $1011_{1-2}$ are each 6-tone STFs and have a duration of 40 μs. STFs $1011_{1-2}$ may be used for AGC, frequency offset estimation, and coarse timing. STFs $1012_{1-2}$ are each 12-tone STFs and have a duration of 40 μs. STFs $1012_{1-2}$ may be used for fine frequency offset estimation, fine timing estimation, and channel estimation. LTFs $1013_{1-2}$ are each 26-tone LTFs and have a duration of 40 μs. LTFs $1013_{1-2}$ may be used for channel estimation.

In an embodiment, the transmission of a SIG field or data may be repeated in order to achieve coding and diversity gain. Repetition may be performed on a block-by-block basis (i.e., block-wise) or on a bit-by-bit basis (i.e., bit-wise). Additionally, the data or the SIG field may be scrambled, error encoded, interleaved, and mapped to a modulation scheme before transmission.

To increase coding and diversity gain, bit-wise repetition may be performed after error correction encoding and before interleaving as described with reference to FIG. 11A.

FIG. 11A shows an example of bit-wise repetition performed after forward error correction (FEC) encoding. In FIG. 11A, a SIG field or data is scrambled by a scrambler 1101 and FEC encoded by FEC encoder 1102. Bit-wise repetition 1103 is then performed on the output of FEC encoder 1102. After bit-wise repetition 1103, an interleaver 1104 is applied. The interleaver 1104 may have any number of columns (for example, eight columns). After interleaving, a mapper 1105 for any modulation scheme, such as BPSK, is applied and modulated data may be transmitted.

In an alternative embodiment, bit-wise repetition may be performed before FEC encoding. FIG. 11B shows bit-wise repetition performed before FEC encoding.

In another alternative embodiment, bit-wise repetition may be performed before FEC encoding and repeated bits may be separately FEC encoded and interleaved, as described with reference to FIG. 11C.

Figure 11C:
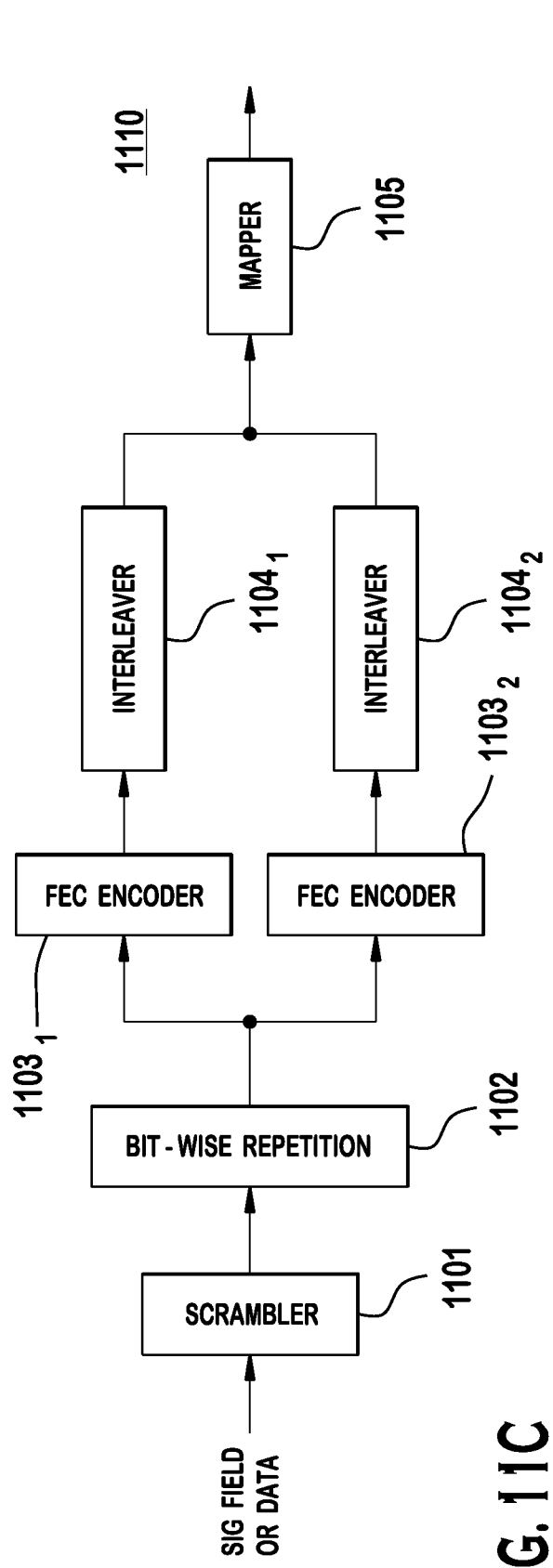
FIG. 11C shows bit-wise repetition performed before FEC encoding.

FIG. 11C shows bit-wise repetition performed before FEC encoding. In FIG. 11C, a SIG field or data is scrambled by a scrambler 1101 and bit-wise repetition 1103 is then performed on the output of the scrambler 1101. The output of bit-wise repetition 1103 is then separately FEC encoded and interleaved, whereby FEC encoder $1103_1$ and interleaver $1104_1$ are applied to a first output of the bit-wise repeater 1102, and FEC encoder $1103_2$ and interleaver $1104_2$ are applied to a second output of the bit-wise repeater 1102. Mapper 1105 is then applied to the output of both interleaver $1104_1$ and interleaver $1104_2$, and modulated data may be transmitted.

In another embodiment, block-wise repetition may be performed in place of bit-wise repetition. Block-wise repetition may be performed after FEC encoding, as described with reference to FIG. 12.

Figure 12:
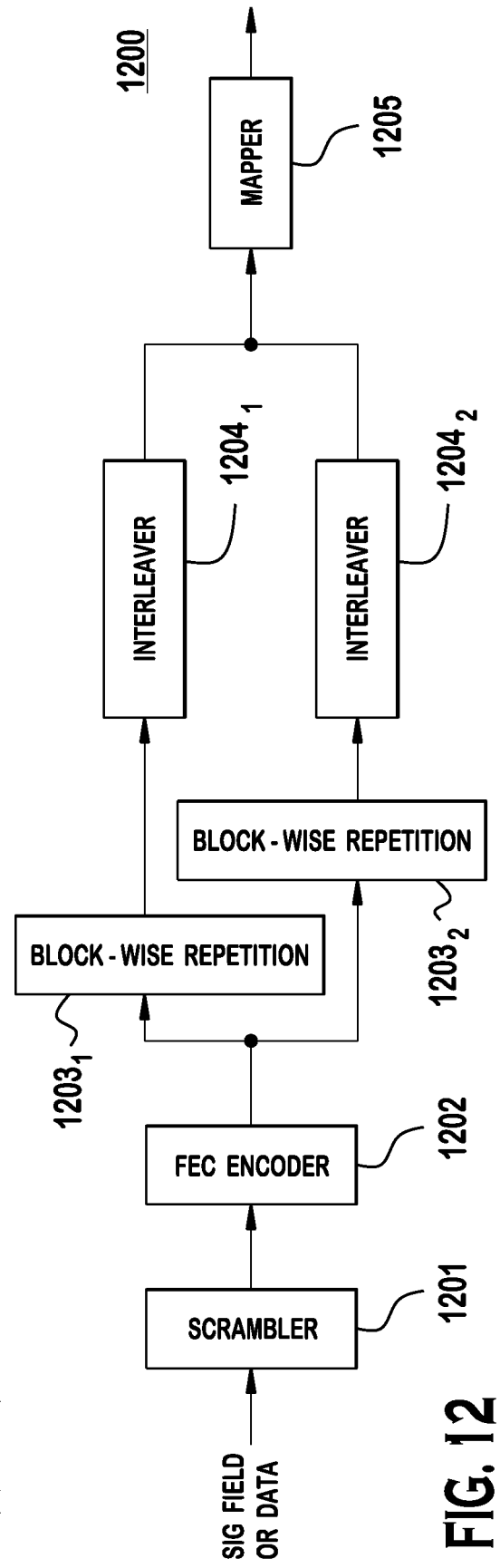
FIG. 12 shows an example of block-wise repetition performed after FEC encoding.

FIG. 12 shows an example of block-wise repetition performed after FEC encoding. In FIG. 12, a scrambler 1201 is applied to a SIG field or data. The output of the scrambler 1201 is then FEC encoded by FEC encoder 1202. The output of FEC encoder 1202 is then separately block-wise encoded and interleaved, whereby block-wise encoder $1203_1$ and interleaver $1204_1$ are applied to a first output of the FEC encoder 1202, and block-wise encoder $1203_2$ and interleaver $1204_2$ are applied to a second output of the FEC encoder 1202. The outputs of interleavers $1204_1$ and $1204_2$ are then combined and provided to mapper 1205 for modulation mapping, and mapped data may be transmitted.

The use of repetition may be implicitly indicated when bandwidth selection is indicated. For example, if a 1 MHz or a 2 MHz bandwidth is indicated, then the use of repetition is implicitly indicated, and vice-versa. Further, in IEEE 802.11 communication, the use of repetition may be indicated by an RXVECTOR. An RXVECTOR may have a list of parameters that a physical layer (PHY) provides to a local MAC entity. For example, the RXVECTOR may indicate the use of either one of a 1, 2, 4, or 8 MHz bandwidth, or the use of one of a 2, 4, 8, or 16 MHz bandwidth. Further, repetition may be used only when the RXVECTOR indicates the use of either one of a 1, 2, 4, or 8 MHz bandwidth.

In another embodiment, transmit antenna diversity with cyclic shifting may be employed for transmitting a SIG field or data to increase frequency diversity, as described with reference to FIG. 13. Further, to achieve repetition gain, the SIG field or data may be bit-wise or block-wise repeated, as described with reference to FIGS. 11A-C and 12, prior to being transmitted using antenna diversity and cyclic shifting.

Figure 13:
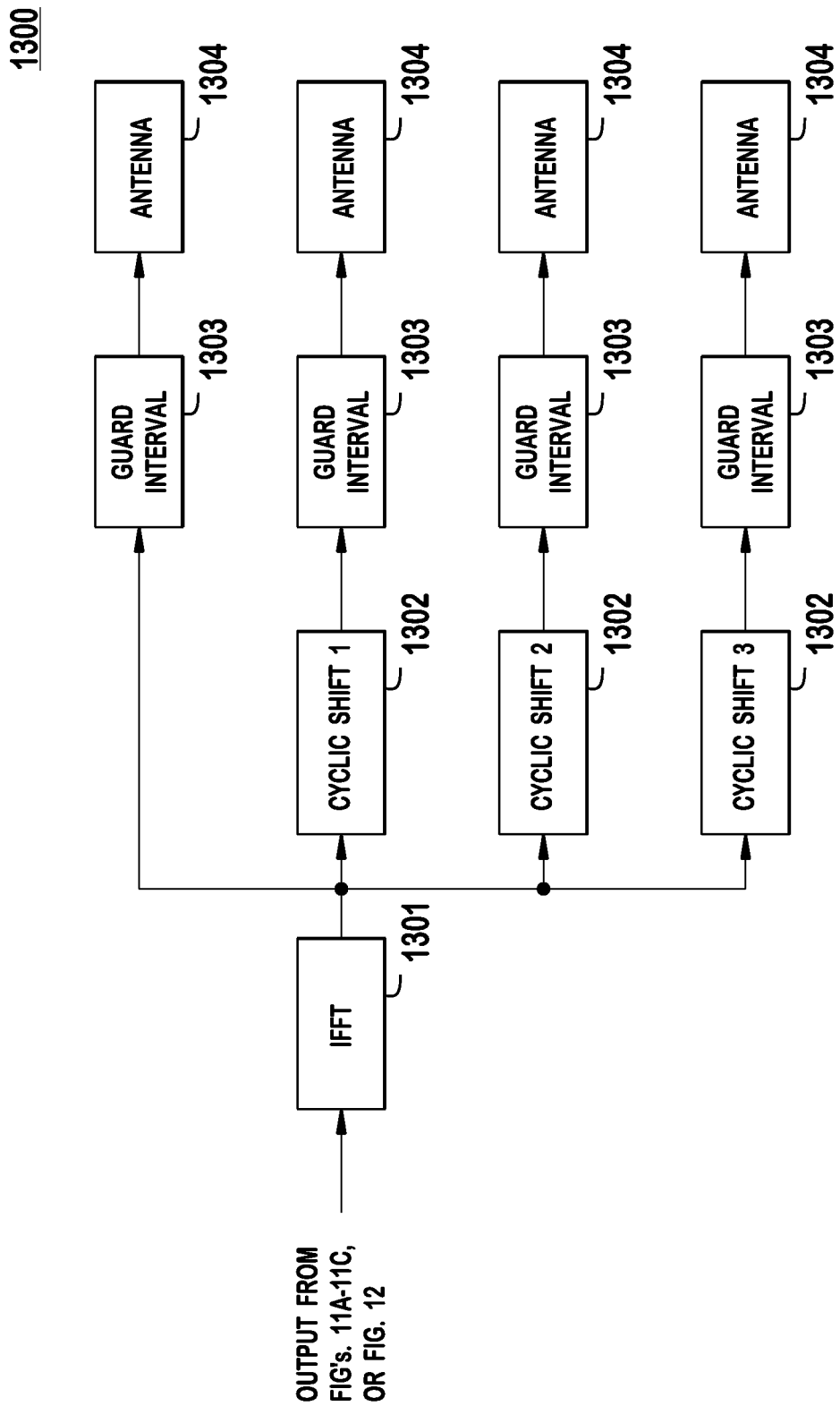
FIG. 13 shows transmission of a SIG field or data using antenna diversity and cyclic shifts.

FIG. 13 shows transmission of a SIG field or data using antenna diversity and cyclic shifts. A SIG field or data that is an output of FIG. 11A-C or 12 (i.e., a SIG field or data that is scrambled, FEC-encoded, repeated, interleaved, or mapped to a modulation scheme) is provided to an IFFT 1301. The output of the IFFT 1301 is provided to each of four paths. In a first path, a short GI 1303 is inserted, in a second path a first cyclic shift $1302_1$ and a short GI 1303 are inserted, in a third path a second cyclic shift $1302_2$ and a short GI 1303 are inserted, and in a fourth path a third cyclic shift $1302_3$ and a short GI 1303 are inserted. After cyclic shift and short GI insertion, data is transmitted using antennas 1304 for each path. It is noted that repetition and frequency diversity gain are achieved because each path receives from the IFFT 1301 a SIG field, a repeated SIG field, or a combination of a SIG field and a repeated SIG field.

In an embodiment, a power headroom report may be requested from a receiver, for example, using a power headroom request, and a power headroom report may be provided by a receiver. If there are multiple receivers in a serving area, a power headroom request may be sent to the multiple receivers, for example, using a power headroom poll.

A power headroom response may be transmitted using round robin reports or simultaneous reporting using orthogonal reporting, such as orthogonal data signatures. Further, a received signal strength indication (RSSI) or a received channel power indication (RCPI) may be measured based on a preamble or a data transmission, and if the RSSI or RCPI changes from a previous measurement, a correction in transmit power may be determined taking into account the power headroom of multiple receivers.

A CRC code for a SIG field of a preamble may be punctured in order to reduce a number of parity bits. By optimally puncturing a CRC code, a shorter code may be generated. For example, an 8-bit CRC code may be punctured to generate a 4-bit CRC code.

In an example, an 8-bit CRC may be generated using the polynomial $x^8+x^2+x+1$ for a 26-bit SIG field. A resultant parity check matrix for the CRC code may be described as H=[P I$_8$], where P is an 8×26 matrix and I$_8$ is an 8×8 identity matrix. In order to reduce the number of parity bits from 8 to 4, 4 rows may be removed from matrix P to get a 4×26 matrix denoted as P1. A new parity check matrix may be used, where the parity check matrix is H1=[P1 I$_4$], P1 is a 4×26 matrix, and I$_4$ is a 4×4 identity matrix.

In order to avoid a minimum Hamming distance of 1, a requirement may be imposed that no column of the parity check matrix may be composed of all zeros. Therefore, when 4 rows are removed in the example above, it is desirable for the matrix P1 not to have an all-zero column.

The Hamming Weight (HW) distribution of a code may be derived from the parity check matrix as follows: the number of codewords with HW=i is the number of combinations of i columns of the parity check matrix, such that a linear combination is equal to a zero vector.

For an 8-bit code, there are 70 combinations of 4-bit puncturing patterns, (i.e., there are 70 ways to puncture an 8-bit code to a 4-bit code). Table 3 shows a HW distribution for 26 information bits when a 4-bit CRC is derived by puncturing from an 8-bit CRC. Table 4, on the other hand, shows a HW distribution for 38 information bits when a 4-bit CRC is derived by puncturing from an 8-bit CRC. In Tables 3 and 4, the HW distribution is shown for HW=1, 2, 3, 4, and 5. Additionally, $c_0$ represents the most significant bit (MSB) that is punctured and $c_7$ represents the least significant bit (LSB) that is punctured.

| CRC bits | HW = 1 | HW = 2 | HW = 3 | HW = 4 | HW = 5 |
|---|---|---|---|---|---|
| $c_7c_6c_5c_4$ (LSBs) | 3 | 28 | 254 | 1663 | 8839 |
| $c_3c_2c_1c_0$ (MSBs) | 2 | 24 | 247 | 1687 | 8969 |
| $c_5c_2c_1c_0$ | 0 | 31 | 247 | 1658 | 9029 |
| $c_5c_3c_2c_0$ | 0 | 34 | 247 | 1635 | 9029 |
| $c_5c_4c_1c_0$ | 0 | 27 | 265 | 1670 | 8879 |
| $c_5c_4c_2c_0$ | 0 | 31 | 252 | 1657 | 8976 |
| $c_5c_4c_3c_1$ | 0 | 29 | 264 | 1658 | 8890 |
| $c_6c_3c_1c_0$ | 0 | 35 | 246 | 1648 | 8992 |
| $c_6c_3c_2c_1$ | 0 | 29 | 260 | 1662 | 8930 |
| $c_6c_4c_3c_1$ | 0 | 31 | 263 | 1646 | 8901 |
| $c_6c_5c_2c_0$ | 0 | 33 | 259 | 1640 | 8909 |
| $c_6c_5c_3c_2$ | 0 | 32 | 259 | 1645 | 8925 |
| $c_7c_4c_2c_1$ | 0 | 33 | 248 | 1646 | 9018 |
| $c_7c_4c_3c_0$ | 0 | 29 | 264 | 1658 | 8890 |
| $c_7c_4c_3c_1$ | 0 | 29 | 260 | 1662 | 8930 |
| $c_7c_5c_2c_0$ | 0 | 34 | 255 | 1635 | 8949 |
| $c_7c_5c_4c_1$ | 0 | 32 | 266 | 1629 | 8874 |
| $c_7c_6c_3c_2$ | 0 | 29 | 262 | 1674 | 8896 |

Table 3 shows a HW distribution when a 4-bit CRC is derived from an 8-bit CRC for 26 information bits.

| CRC Bits | HW = 1 | HW = 2 | HW = 3 | HW = 4 | HW = 5 |
|---|---|---|---|---|---|
| $c_7c_6c_5c_4$ (LSBs) | 3 | 52 | 707 | 6932 | 53267 |
| $c_3c_2c_1c_0$ (MSBs) | 3 | 51 | 697 | 6947 | 53377 |
| $c_5c_3c_2c_0$ | 0 | 65 | 692 | 6867 | 53564 |
| $c_5c_4c_2c_0$ | 0 | 58 | 711 | 6942 | 53325 |
| $c_6c_4c_3c_1$ | 0 | 56 | 720 | 6938 | 53292 |
| $c_6c_5c_2c_0$ | 0 | 62 | 704 | 6894 | 53426 |
| $c_6c_5c_3c_2$ | 0 | 58 | 717 | 6906 | 53339 |
| $c_7c_4c_2c_1$ | 0 | 65 | 699 | 6865 | 53501 |
| $c_7c_5c_4c_1$ | | 60 | 721 | 6876 | 53323 |

Table 4 shows a HW distribution when a 4-bit CRC is derived from an 8-bit CRC for 38 information bits.

As shown in Tables 3 and 4, puncturing bits $c_7c_6c_5c_4$ (i.e., the four LSBs) or bits $c_3c_2c_1c_0$ (i.e., the four MSBs) does not yield results as good as other alternatives, such as puncturing bits $c_5c_4c_2c_0$, since both $c_7c_6c_5c_4$ and $c_3c_2c_1c_0$ have a minimum hamming distance of 1. Further, any of the puncturing combinations in Tables 3 and 4 may be chosen for a code with a minimum distance 2 to detect all single bit-error patterns.

It is worth noting that a puncturing combination such as bits $c_5c_4c_1c_0$ shown in Table 3 yields a probability of false positives that is close to that of an optimal 4-bit CRC generated using the polynomial $x^4+x+1$.

In an embodiment, the type of modulation used for SIG field symbols may be used to signal information, such as information as to whether beamforming is utilized, for example, a SIG field may comprise any number of OFDM symbols, such as 5 OFDM symbols or 6 OFDM symbols. Further, the 6 OFDM symbols may be modulated using quadrature binary phase shift keying (QBPSK) or binary phase shift keying (BPSK). It is worth noting that according to QBPSK, a symbol is modulated using +/−j, whereas according to BPSK, a symbol is modulated using +/−1.

The modulation scheme of any one of the OFDM symbols may be used to signal information. For example, the modulation scheme of the first OFDM symbol may be used to signal that beamforming is utilized, whereby if the first OFDM symbol is modulation using BPSK, then the use of beamforming is not indicated, whereas if the first OFDM symbol is modulation using QBPSK, then the use of beamforming is indicated.

Further, the modulation scheme of the OFDM symbols of the SIG field may be used in conjunction with a CRC attachment or FEC encoding to increase the number of information bits signaled using the SIG field.

Figure 14A:
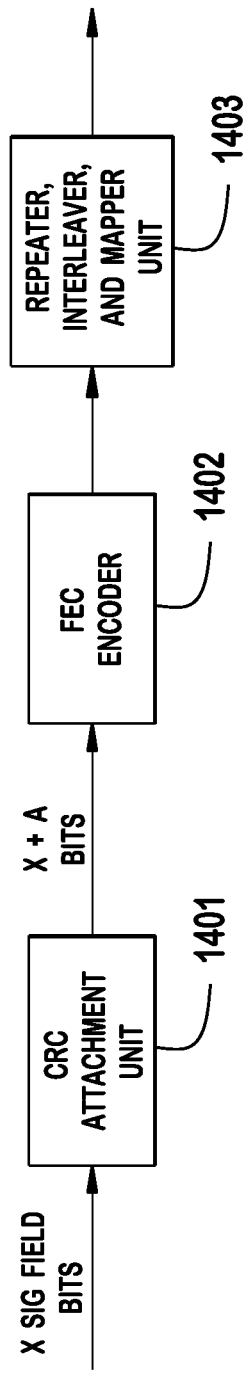
FIG. 14A shows an example of coding of signal (SIG) field bits.

FIG. 14A shows an example of coding of SIG field bits. In FIG. 14A, X bits of a SIG field are provided to a CRC attachment unit 1401. The CRC attachment unit 1401 generates A CRC bits. The X+A SIG field bits and CRC attachment bits are provided to an FEC encoder 1402 to generate an output. The output of the FEC encoder 1402 is then provided to a repeater, interleaver, and mapper unit 1403, and the encoded and modulated X+A field bits and CRC attachment bits may be transmitted.

The number of bits signaled using the SIG field may be increased from X to X+Y while protecting the additional Y SIG fields using CRC encoding as described with reference to FIG. 14B.

Figure 14B:
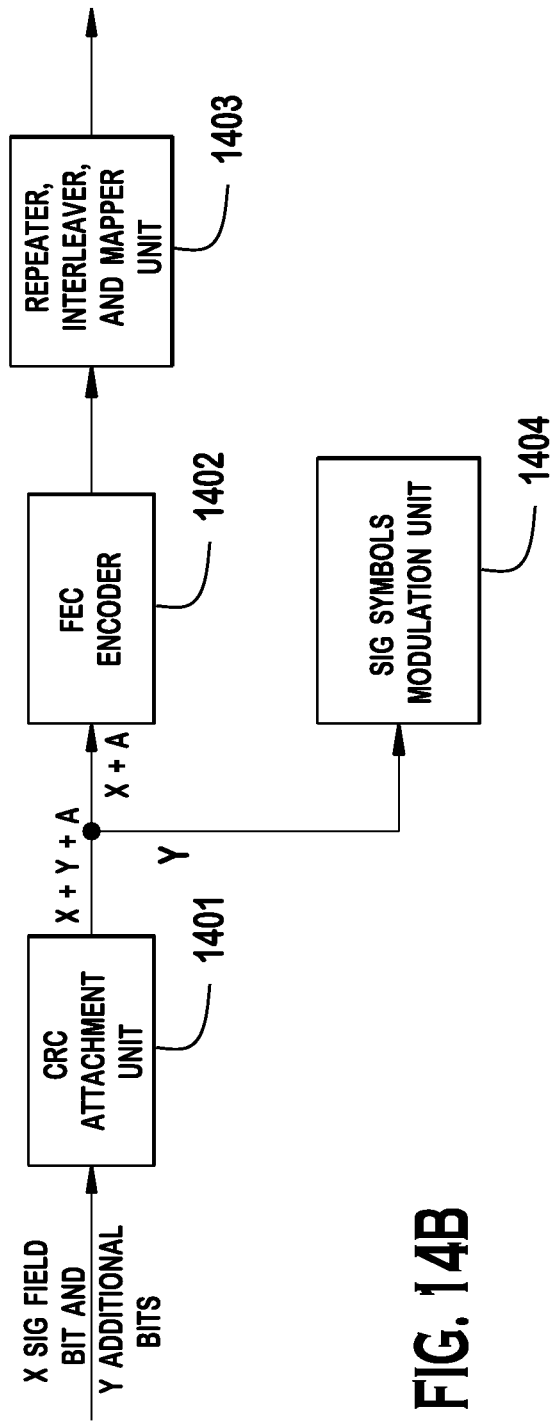
FIG. 14B shows an example of coding of SIG field bits and additional bits.

FIG. 14B shows an example of coding of SIG field bits and additional bits. In FIG. 14B, X SIG field bits and Y additional SIG field bits are provided to a CRC attachment unit 1401. The CRC attachment unit 1401 generates A CRC attachment bits based on both the X SIG field bits and Y additional SIG field bits, and provides an output of X+Y+A bits. The X+A bits pertaining to the SIG field and CRC attachment are provided to an FEC encoder 1402 to generate an output. The output of the FEC encoder 1402 is provided to a repeater, interleaver, and mapper unit 1403 in the same manner as described with reference to FIG. 14A.

However, the Y additional bits may not be transmitted in the same manner as the X+A bits pertaining to the SIG field and CRC attachment. Instead, the Y additional bits may be provided to a SIG symbol modulation unit 1404, which modulates the Y bits using the SIG field OFDM symbols as described above. For example, if the Y bits are [0 0 1 1 1], then five SIG field OFDM symbols may be modulated as

[QQBBB] to indicate the Y bits, where a QBPSK modulation of a SIG field symbol indicates a zero bit and a BPSK modulation indicates a 1 bit.

As described with reference to FIG. 14B, the Y additional bits are protected using the A CRC attachment bits. Further, no additional overhead is needed for signaling the Y additional bits. Further, in addition to CRC attachment, the Y additional bits may also be protected by an FEC code, as described with reference to FIG. 14C.

FIG. 14C shows an example of coding of SIG field bits and additional bits. In FIG. 14C, X SIG field bits and Y additional bits are provided to a CRC attachment unit 1401. The CRC attachment unit 1401 generates A CRC bits and provides an output of X+Y+A bits to the FEC encoder 1402, which generates an output. A first portion of the output of the FEC encoder 1402 is provided to a repeater, interleaver, and mapper unit 1403 and a second portion of the output of the FEC encoder 1402 (for example, 5 or 6 bits) is provided to a SIG symbol modulation unit 1404, which modulates the Y bits using the SIG field OFDM symbols as described above.

Further, the modulation scheme of the OFDM symbols of the SIG field may be used to introduce more CRC attachment bits in order to improve the robustness of the CRC attachment. For example, the CRC attachment may be increased from A bits to A+B bits. Further, the additional B CRCs bits may signaled using the modulation of the OFDM symbols. Further, the additional B CRC bits may be further coded using any coding scheme as described with reference to FIG. 14D.

FIG. 14D shows an example of coding of SIG field bits and additional CRC bits. In FIG. 14D, X SIG field bits are provided to a CRC attachment unit 1401. The CRC attachment unit 1401 generates a CRC attachment of A+B bits (i.e., the CRC attachment unit 1401 generates B additional attachment bits than shown in FIGS. 14A-C). The X SIG field bits and the A CRC attachment bits are provided to FEC encoder 1402 to generate an output. The output of the FEC encoder 1402 is provided to a repeater, interleaver, and mapper unit 1403, and may then be transmitted. On the other hand, the B CRC attachment bits are provided to a (B,Z) encoder 1405. The (B,Z) encoder 1405 encodes the B CRC attachment bits using Z bits, (for example, the (B,Z) encoder may encode B=4 bits using Z=6 bits). The Z bits are provided to a SIG symbol modulation unit 1404 which modulates the Z bits using the SIG field OFDM symbols as described above.

In an embodiment, a cyclic shift may be applied to Greenfield preamble, such as Greenfield preamble 400. The cyclic shift may prevent unintentional beamforming when identical signals are transmitted on different spatial streams. The cyclic shift may be similar to a cyclic shift used in a subsequent data transmission particularly in the case where the same data transmission is performed over multiple antennas. However, the values of the cyclic shift used in the Greenfield preamble and a subsequent data transmission may be different for different antennas.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A station (STA) comprising:
    a transceiver configured to receive a frame, the frame including a signal (SIG) field and a data field, the SIG field including an indication of midamble periodicity; and
    a processor operatively coupled to the transceiver, the processor configured to decode the data field, based on the SIG field.

2. The STA of claim 1, wherein the indication of midamble location provides a symbol offset of the at least one midamble.

3. The STA of claim 1, wherein the indication of midamble location provides a symbol offset between a first midamble and a second midamble.

4. The STA of claim 1, wherein the indication of midamble location indicates a fixed number of symbols between the at least one midamble.

5. The STA of claim 1, wherein the processor and the transceiver are further configured to measure a channel quality associated with the received frame based on the at least one midamble in the data field and the indication of midamble location in the data field.

6. The STA of claim 5, wherein the processor and the transceiver are further configured to transmit a feedback message including information indicative of the measured channel quality.

7. The STA of claim 1, wherein the at least one midamble is usable to facilitate updating of a channel estimate.

8. The STA of claim 1, wherein the processor and the transceiver are further configured to transmit a request to change a number of the at least one midamble in consecutive frames.

9. The STA of claim 8, wherein the number of the at least one midamble received by the STA changes based on the request to change.

10. A method performed by a STA, the method comprising:
    receiving, via a transceiver, a frame including a signal (SIG) field and a data field, the SIG field including an indication of midamble; and
    decoding, via a processor, the data field, based on the SIG field.

11. The method of claim 10, wherein the indication of midamble location provides a symbol offset of the at least one midamble.

12. The method of claim 10, wherein the indication of midamble location provides a symbol offset between a first midamble and a second midamble.

13. The method of claim 10, wherein the indication of midamble location indicates a fixed number of symbols between the at least one midamble.

14. The method of claim 10, further comprising:
    measuring when at least one midamble is present in the data field and the indication of midamble location in the data field, a channel quality associated with the received frame.

15. The method of claim 10, further comprising:
transmitting a feedback message including information indicative of the measured channel quality.

16. The method of claim 10, wherein is usable to facilitate updating of a channel estimate.

17. The method of claim 10, further comprising transmitting a request to change a number of the at least one midamble in consecutive frames.

18. The method of claim 17, wherein the number of at least one midamble received by the STA changes based on the request to change.

* * * * *

UNITED STATES PATENT AND TRADEMARK OFFICE
CERTIFICATE OF CORRECTION

| | | |
|---|---|---|
| PATENT NO. | : 11,611,414 B2 | Page 1 of 1 |
| APPLICATION NO. | : 16/213633 | |
| DATED | : March 21, 2023 | |
| INVENTOR(S) | : Ghosh et al. | |

It is certified that error appears in the above-identified patent and that said Letters Patent is hereby corrected as shown below:

In the Claims

In Claim 10, at Column 26, Line 51, after the word "midamble" insert -- "periodicity" --.

Signed and Sealed this
Fifteenth Day of October, 2024

Katherine Kelly Vidal
*Director of the United States Patent and Trademark Office*